(12) United States Patent
Valli et al.

(10) Patent No.: US 12,469,102 B2
(45) Date of Patent: Nov. 11, 2025

(54) VIEWING DISTANCE BASED RESOLUTION CONTROL FOR VIDEO CODING

(71) Applicant: Adeia Guides Inc., San Jose, CA (US)

(72) Inventors: Seppo Valli, Espoo (FI); Pekka Siltanen, Helsinki (FI)

(73) Assignee: Adeia Guides Inc., San Jose, CA (US)

( * ) Notice: Subject to any disclaimer, the term of this patent is extended or adjusted under 35 U.S.C. 154(b) by 239 days.

(21) Appl. No.: 18/129,641

(22) Filed: Mar. 31, 2023

(65) Prior Publication Data

US 2024/0331085 A1 Oct. 3, 2024

(51) Int. Cl.
*G06T 3/40* (2024.01)
*G06F 3/01* (2006.01)

(52) U.S. Cl.
CPC ............... *G06T 3/40* (2013.01); *G06F 3/011* (2013.01)

(58) Field of Classification Search
CPC ........ G06F 3/012; G06F 3/011; G06F 3/0485; G06F 3/013; G06F 3/147; G06F 3/1423; G06F 3/1454; G06F 2203/04806; G06F 30/367; G06T 3/40; G06T 2207/30168; G06T 7/30; G06T 5/50; G06T 15/005; G09G 5/006; G09G 2370/16; G09G 2340/0457; G09G 2370/022; G09G 2340/0442; G09G 2354/00; G09G 2340/04; G09G 2370/20; G09G 2370/042; H04N 13/122; H04N 13/194; H04N 13/302; G06V 10/764; G06V 10/44
See application file for complete search history.

(56) References Cited

U.S. PATENT DOCUMENTS

| | | | |
|---|---|---|---|
| 7,508,374 B2 | 3/2009 | Tsunoda | |
| 11,259,081 B2 | 2/2022 | Chundi et al. | |
| 11,356,638 B2 | 6/2022 | Reznik et al. | |
| 2008/0316372 A1 | 12/2008 | Xu et al. | |
| 2012/0127319 A1* | 5/2012 | Rao | H04N 23/695 348/169 |
| 2014/0223374 A1* | 8/2014 | Park | G06F 3/0488 715/825 |
| 2015/0269736 A1* | 9/2015 | Hannuksela | H04N 13/395 345/419 |

(Continued)

FOREIGN PATENT DOCUMENTS

| | | |
|---|---|---|
| WO | 2017058665 A1 | 4/2017 |
| WO | 2018049321 A1 | 3/2018 |

OTHER PUBLICATIONS

Akeley, Kurt, et al., "A stereo display prototype with multiple focal distances, " ACM Trans. Graph., 23(3):804-813 (2004).

(Continued)

*Primary Examiner* — Xilin Guo
(74) *Attorney, Agent, or Firm* — HALEY GUILIANO LLP

(57) ABSTRACT

Systems and methods relate to viewing distance based resolution and/or quality control for video coding. An illustrative system receives, such as at a server, a distance between a user and a device. The system includes selecting, based at least in part on the distance between the user and the device, a resolution and/or quality level for each layer of a plurality of layers of an image. The system transmits a version of each layer at the selected quality level to the device to cause the device to reconstruct the image based on the transmitted version of each layer and generate for display the reconstructed image.

20 Claims, 15 Drawing Sheets

(56) References Cited

U.S. PATENT DOCUMENTS

| | | |
|---|---|---|
| 2020/0014961 A1 | 1/2020 | Ramaswamy et al. |
| 2021/0133994 A1* | 5/2021 | Valli ................... G02B 27/017 |
| 2021/0240792 A1* | 8/2021 | Feng ................... G06F 16/9535 |
| 2022/0121277 A1* | 4/2022 | Azam ................. G06F 3/04847 |
| 2022/0214743 A1* | 7/2022 | Dascola ................ G06F 3/017 |
| 2024/0090302 A1* | 3/2024 | Yamazaki ........... G06V 40/1329 |

OTHER PUBLICATIONS

Burt, Peter J., et al., "The Laplacian Pyramid as a Compact Image Code," IEEE Transactions on Communications, 31(4):532-540 (1983).

Wu, Tao, et al., "A Study on Fusion of Different Resolution Images," Procedia Engineering, 29:3980-3985 (2012).

Yu, Teng-To et al. "Mapping Asbestos-Cement Corrugated Roofing Tiles with Imagery Cube via Machine Learning in Taiwan," Remote Sensing, 14:3418 (2022) (14 pages).

* cited by examiner

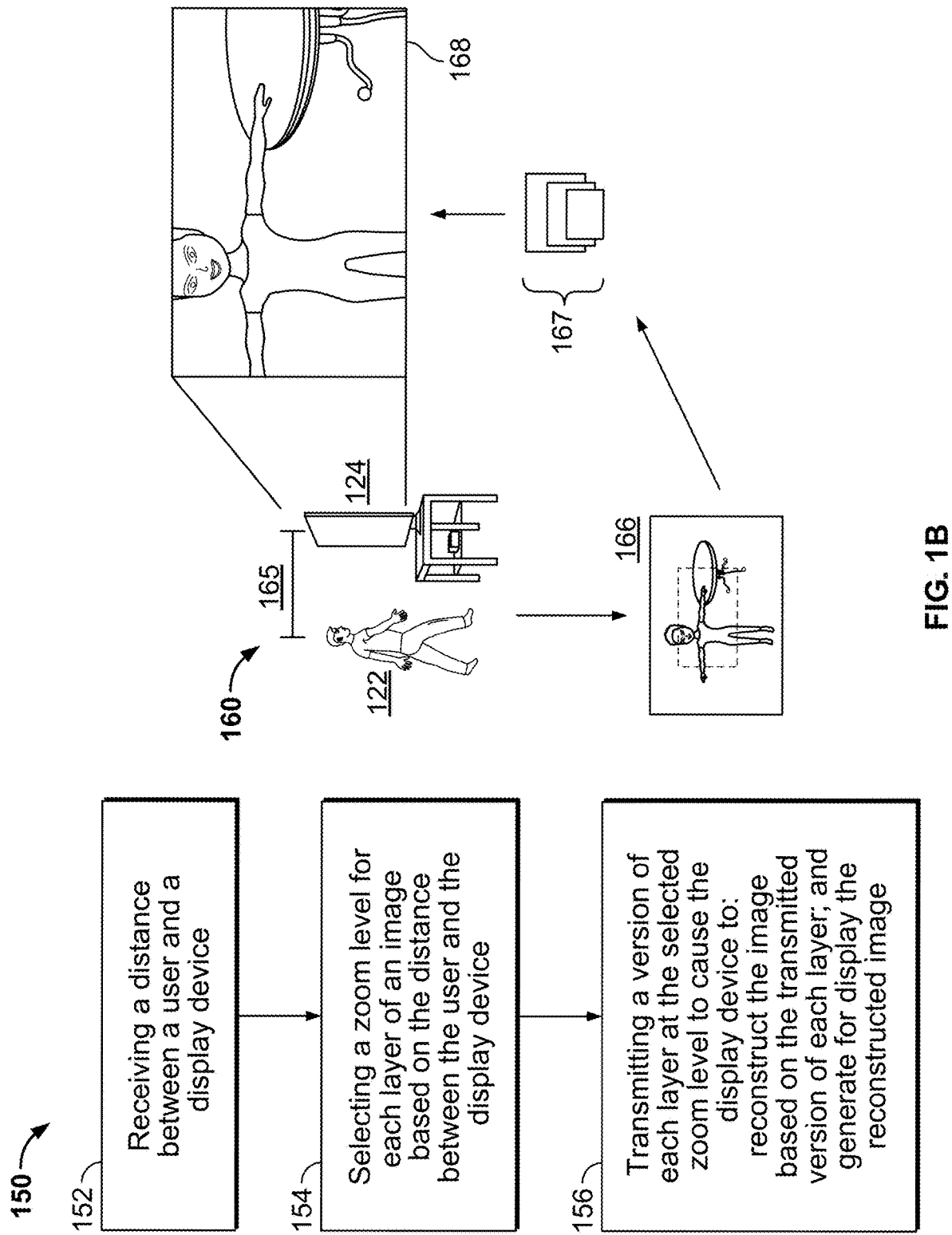

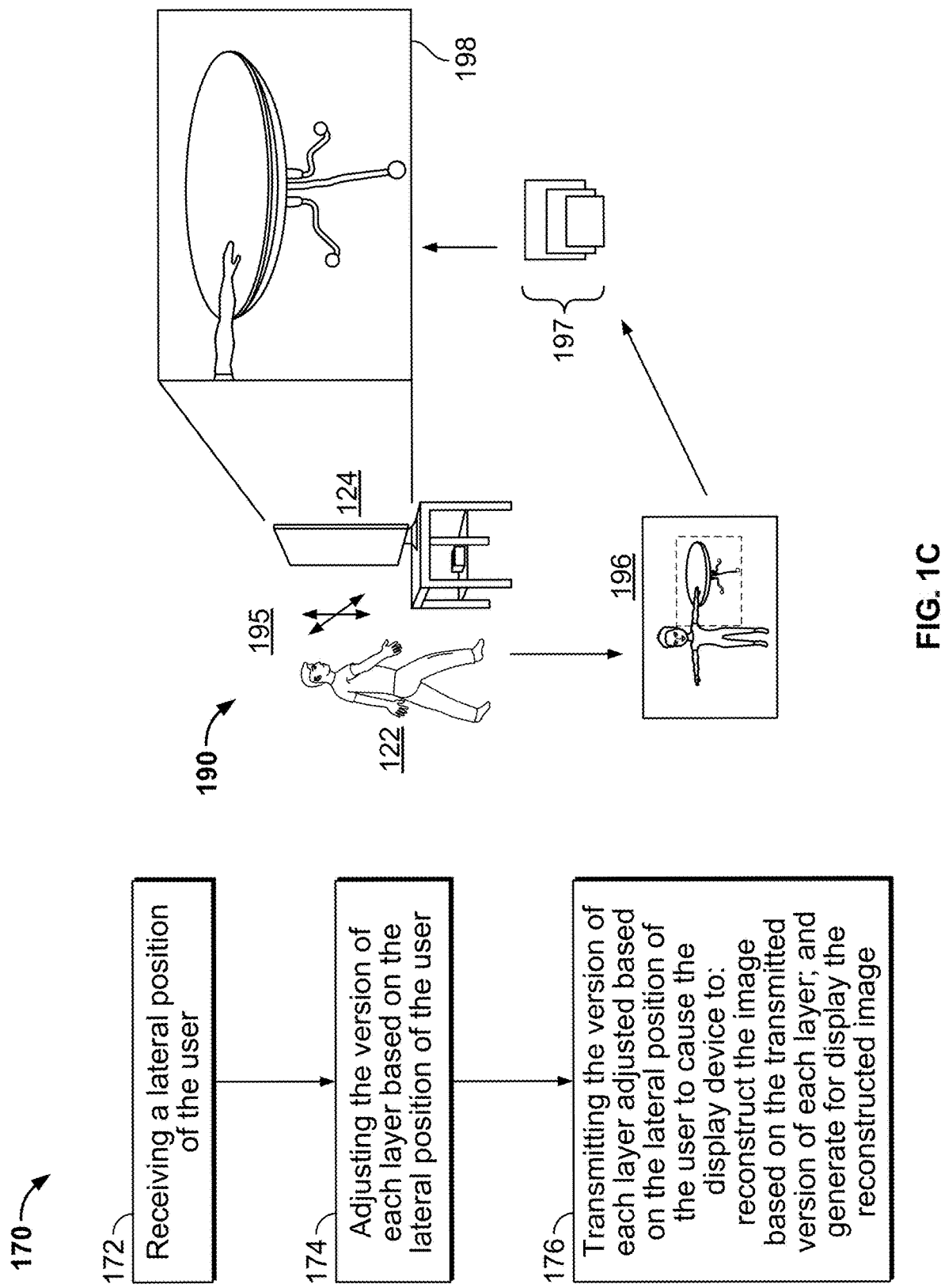

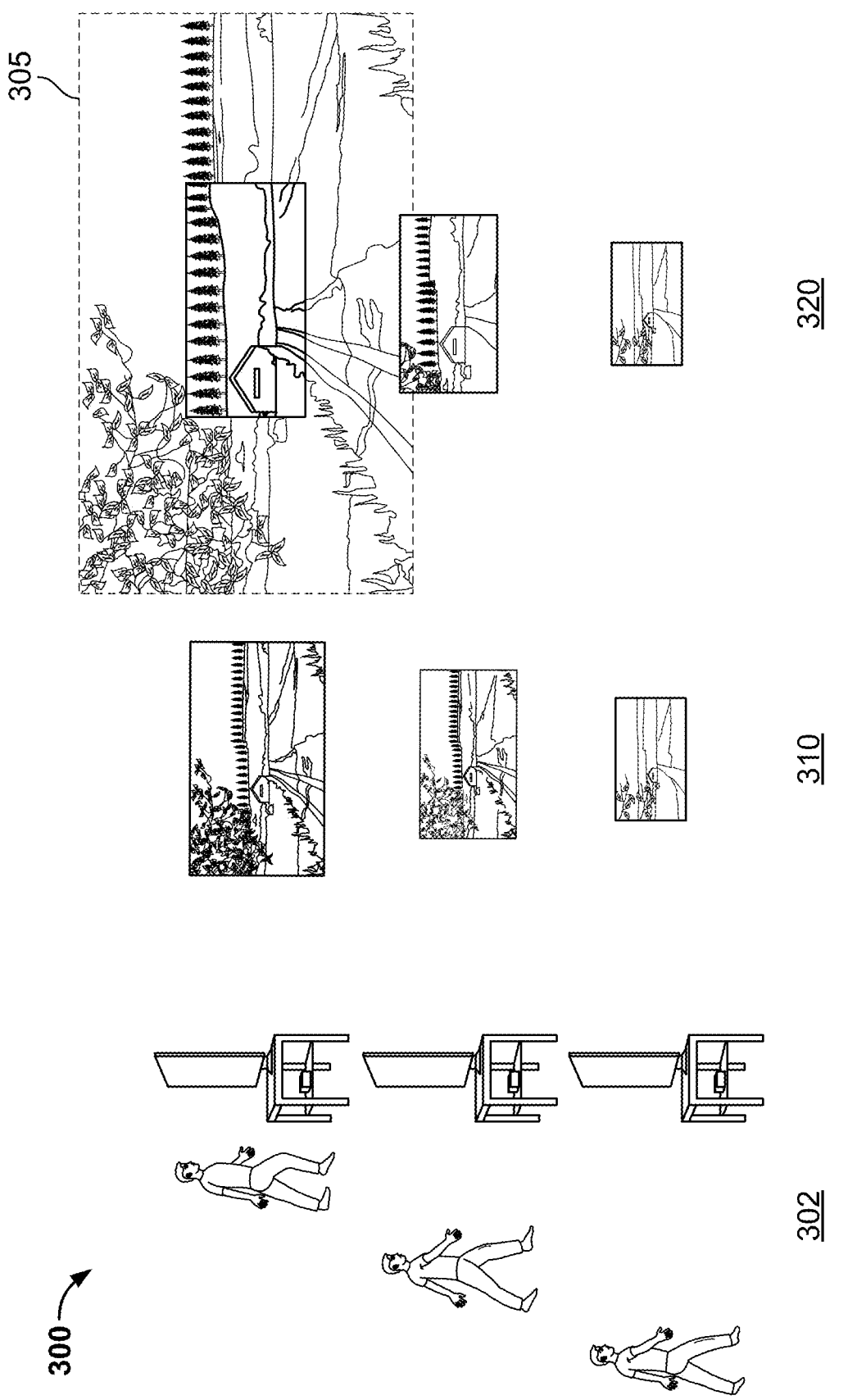

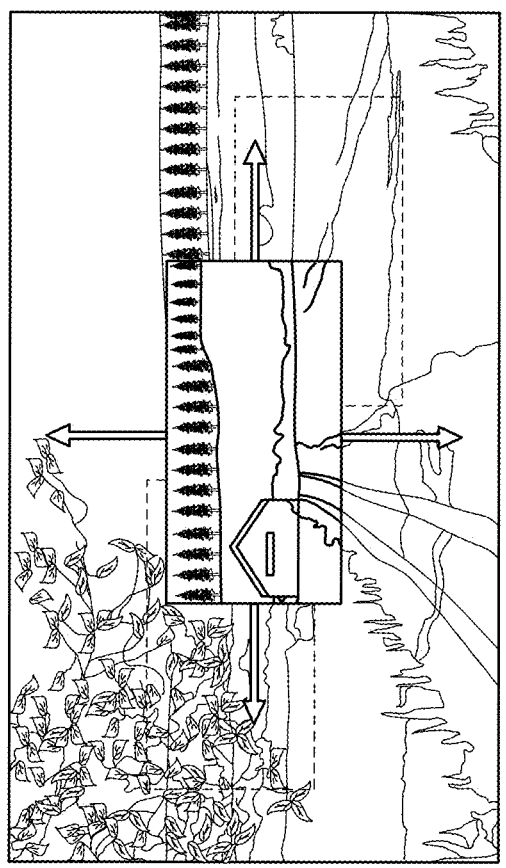
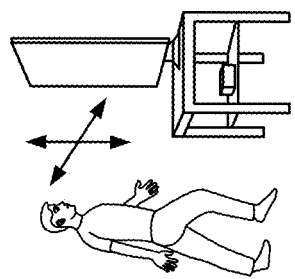
403
402
FIG. 4
400

VIEWING DISTANCE BASED RESOLUTION CONTROL FOR VIDEO CODING

BACKGROUND

This disclosure is generally directed to techniques for encoding and decoding video frames.

SUMMARY

Improved resolutions of displays enable better support for viewing content from varying distances. However, existing viewing paradigms, services, and content may still be largely influenced by early broadcast services, when fixed distances were used both when capturing and displaying content. To enhance user experience, a viewer may prefer having a more natural user experience for seeing content up close on a display. This desire for a more natural user experience may be present not only with TVs and flat screens, but also with cell phones and glasses-type near-eye displays (NEDs). With NEDs, a further challenge is to avoid vergence-accommodation conflict (VAC), which can disturb the consumption of stereoscopic (S3D) content.

Viewers may desire better support for user and/or display mobility for viewing content at varying distances on a display. However, while user and/or display mobility may be utilized to make viewing more natural and interactive (e.g., viewing in the real-world) it may be more difficult to support such natural and interactive interactions on a display. Also, higher resolutions of displays tend to increase bitrates and computational load.

The present disclosure helps to address the problems described above, by, for example, providing systems and methods that supports a more natural way of viewing and interacting with both real-time, broadcasted, and/or stored content. The more natural way of interaction mimics viewing in a 3D space/virtual world but is based on high-resolution 2D captures of a scene (e.g., video plus depth). In some embodiments, a captured scene is decomposed into a stack of depth dependent focal planes or multi-focal planes (MFPs). The MFPs may be presented with varying resolution, depending on a viewer's distance from the display. With the disclosed multiresolution approach, bitrates and processing power may be reduced.

The present disclosure describes several multi-resolution paradigms (modes). Each mode may enhance 2D content delivery using video-plus-depth format in data capture and transmission. The present disclosure enables seeing content details based on natural motion interactions. For example, content resolution may be increased when seeing a display from close, e.g., a relatively constant accuracy is perceived at different viewing distances.

In an enhanced quality mode, a rendering size of an image is kept fixed at varying viewing distances, but a resolution of the image varies at different depths. For example, as a viewing distance to a display decreases, portions of the image at greater depth may increase in resolution, and portions of the image at a shorter depth may decrease in resolution. The enhanced quality mode may improve a user's experience by creating a more natural depiction of content (e.g., making viewing a 2D image emulate a viewing of objects in the real world). For example, as a user approaches a distant object, more detail may be observed for the distant object while nearby objects may be lower in detail (but still having high quality due to large scale of the closer object). The enhanced quality mode may enable savings in bitrate and processing power by coding different depths at different resolution levels. For example, lowering resolution for portions of the image at closer depths may reduce bits and costs (e.g., resulting in reduction in bitrates and processing power).

In a zoom mode (e.g., magnifying glass mode, magnify mode), a rendering size of an image may be changed at varying viewing distances. For example, an enlarged sub-view of an image may be shown at a shorter viewing distance (e.g., zoom level of the image varies based on viewing distance). The zoom mode may improve a user's experience by enabling a more intuitive way for viewing content up close by providing a zoom level based on a viewing distance. The zoom mode may enable savings in bitrate and processing power by coding portions of the image at different viewing distances. For example, coding a portion of an image at closer depths may be made with less bits and costs (e.g., resulting in reduction in bitrates and processing power).

In some embodiments, a combination of the enhanced quality mode and zoom mode may be used to present an enlarged sub-view of the image with a resolution that varies at different depths based on distance to the screen. For example, as a viewing distance to a display decreases, the viewer may view an enlarged portion of the image which may increase in resolution for portions of the image at greater depth and may decrease in resolution for portions of the image at shorter depth.

In some embodiments, viewing streamed or stored content is improved by using enhanced 2D-images to enable natural 3D interactions based on distance and/or position (e.g., which may vary due to viewer motions and interests). The disclosed approach may be applied in viewing content on TV sets and flatscreens, and glasses or other mobile devices.

The disclosed approach can use video plus depth data (texture plus depth map). Knowledge on pixel distances in a captured view (e.g., depth map) may be used for adjusting the resolution for distant features higher when a user approaches a display (or vice versa).

The disclosed approach enables better 3D world like accuracy when the content is seen from close. Controlling the content resolution (e.g., accuracy) may be made in the transmitter based on knowledge on both pixel distances and the viewing distance obtained from the receiver. In addition to better support for real-world like 3D interactions, the disclosed approach may enable savings in bitrate and corresponding costs.

In one general aspect, a method may include receiving, at a computing device (e.g., a server), a distance between a user and a display device. The method may include selecting, based at least in part on the distance, a quality level (e.g., resolution level) for each layer of a plurality of layers of an image. For example, a quality level may refer to a resolution of each layer of the image. The method may include transmitting a version of each layer at the selected quality level to the device to cause the device to reconstruct the image based on the transmitted version of each layer, and generate for display the reconstructed image.

Implementations may include one or more of the following features. The method may include encoding each layer at the selected quality level. For example, a system may encode each layer in real-time at the selected quality level, which may be a resolution level or number of pixels in each layer. The method may include accessing a pre-encoded version of each layer at the selected quality level. For example, the image may be stored as layers at different resolution levels that a server may access. A version of each layer may be pre-encoded prior to transmission and stored. For example, a version of each layer may be stored as chunks identified by a manifest used by MPEG-DASH, and a system may access the stored version of each layer. In some embodiments, the plurality of layers are multi-focal planes (MFPs) and the reconstruction of the image may include summing the MFPs. In some embodiments, a deeper or farther-away layer of the plurality of layers of the image is selected at a higher quality as a distance decreases between the user and the device.

In some embodiments, other suitable techniques may be used to control depth resolution.

In some embodiments, the MFPs can be displayed on an accommodative display (e.g., MFP display), and each layer can be displayed at a different distance. In such cases, eyes of a viewer may add up light intensities of MFPs rendered (optically) at different distances.

In some embodiments, the device is a television or a computer display, and the distance between the user and the device is a distance between a face of the user and the television or the computer display. The device may be any external (flat) display, including e.g. a digital signage display. In some embodiments, the device is a handheld device (e.g., mobile phone), and the distance between the user and the device is a distance between a face of the user and the handheld device. In some embodiments, the device is an extended reality (XR) device, and the distance between the user and the device is a distance between a hand of the user and the XR device.

The method may include causing the device to select a zoom level for the transmitted version of each layer of the plurality of layers of the image based on the distance between the user and the device, and modify each respective layer according to the selected zoom level. The method may include causing the device to detect a lateral position of the user to the device, and modify each respective layer according to the lateral position of the user to the device. In some embodiments, the device is a mobile phone, and the lateral position is based on a lateral position of a face of the user in a frontal camera view of a mobile phone. In some embodiments, the device is an extended reality (XR) device, and the lateral position is based on a lateral position of a hand of the user to a XR device. Implementations of the described techniques may include hardware, a method or process, or a computer tangible medium.

As a result of the use of these techniques, viewing streamed or stored content can be enhanced using improved 2D-images to support natural 3D interactions based on viewer motions and interests. The approach can be applied in viewing content on TVs, computer displays, flatscreens, XR head mounted devices, glasses, handheld devices, mobile phones and MFP displays.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 1B shows an example method of viewing distance based resolution control of image data in a zoom mode, in accordance with some embodiments of this disclosure;

FIG. 1C shows an example method of viewing distance based resolution control of image data with panning in a zoom mode, in accordance with some embodiments of this disclosure;

FIG. 3 depicts examples of an enhanced quality mode and a magnifying mode for viewing distance based resolution control of image data, in accordance with some embodiments of this disclosure;

FIG. 4 depicts an illustration of interactive panning in the magnifying mode, in accordance with some embodiments of this disclosure;

DETAILED DESCRIPTION

Figure 1A:
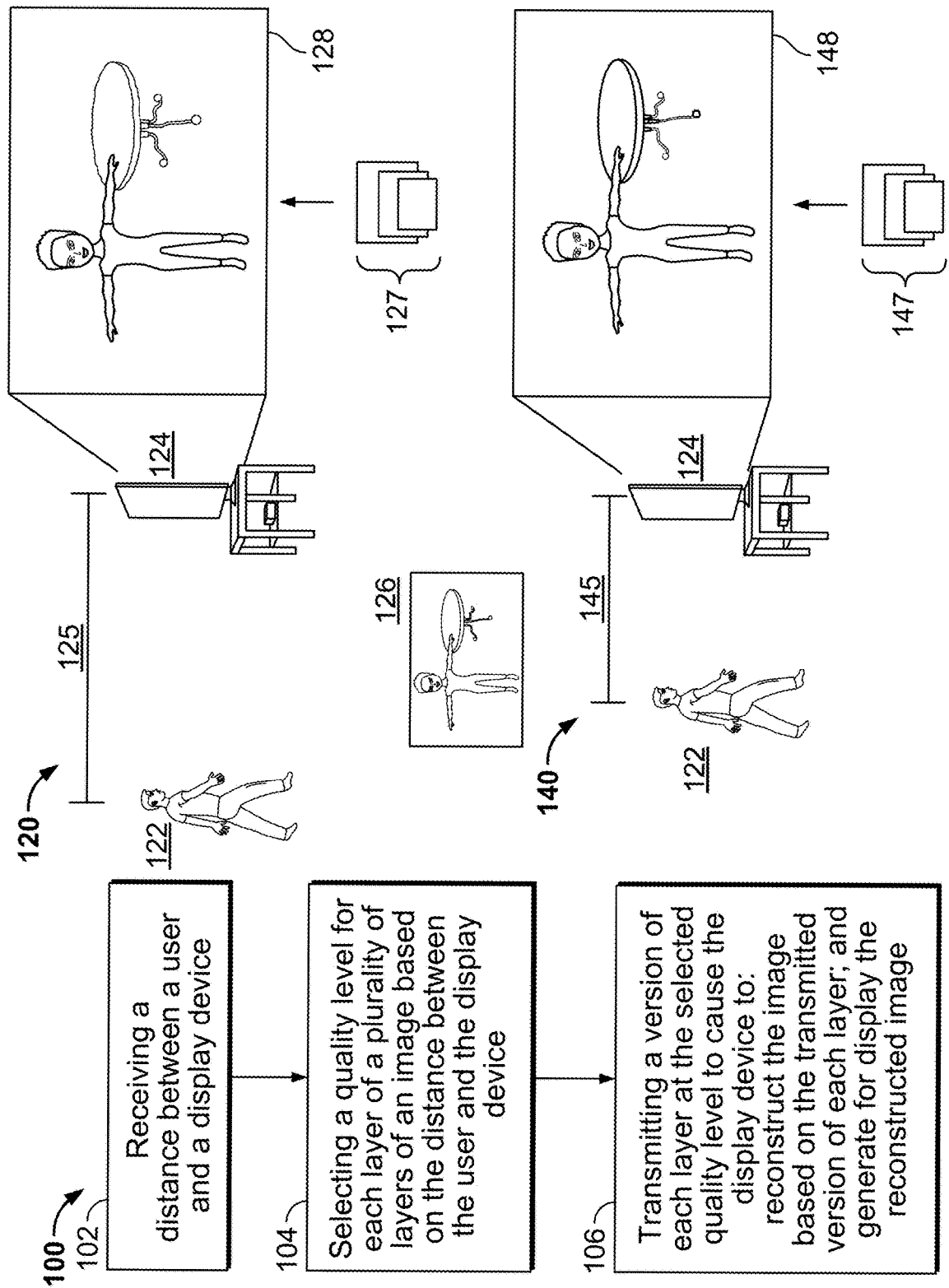
FIG. 1A shows an example method of viewing distance based resolution control of image data in an enhanced quality mode, in accordance with some embodiments of this disclosure.

With flat screens and TVs, increasing resolution suggests viewing content from shorter distances. The content naturally also reveals more details at close distances, provided that it is supported by high enough resolution and quality. The support for viewing content at varying distances may also mean better mobility for the user. An increasingly important device for viewing content is AR/VR glasses, more generally called near-eye displays (NED). Mimicking or synthesizing motion-based user interactions is possible with NEDs. Seeing details with about the same quality anywhere in a 3D space may be a common paradigm with virtual glasses. However, with broadcast or streamed content (including telepresence), seeing high quality details in a 3D volume may be poorly supported. Mobile devices (e.g. cell phones) are also increasingly used for seeing visual content, which is supported by the increasing resolution and size of mobile screens. The mobility of these devices both enables and desires new paradigms and ways of content interaction and consumption. In addition to improved user mobility, the disclosed approach may also improve mobility of devices.

The golden standard for viewing content is 3D perception in the real world. The disclosed approach may improve the naturalness of current 2D content services by better supporting 3D interactions. For example, approaching an object on a 2D display can reveal more details like a 3D object in the real world. A natural paradigm may be to see a scene and its details, such as with a magnifying glass. This paradigm may be desirable to users, and content and use-cases could benefit from interactively seeing content from/at varying distances. Seeing a display from close, especially when the view is magnified, may require adequate image resolution in rendering. The disclosed approach may support adjusting the resolution by the viewing distance. Correspondingly, the disclosed paradigm is supported by multi-resolution, multi-layered content retrieval.

The disclosed approach introduces an intuitive paradigm for viewing streamed or stored content. In particular, the disclosed approach improves 2D-image based solutions by supporting natural 3D interactions based on viewer motions and interests. The disclosed approach can be applied in viewing content on TV sets and flatscreens, and glasses or other mobile devices.

An input format for the system is video plus depth data (texture plus depth map). In the disclosed approach, the knowledge of pixel distances in a captured view (e.g., depth map) may be used for adjusting the resolution for distant features higher when a user approaches a display (or vice versa). This enables better 3D world like accuracy when the content is seen from close. Controlling the content resolution (e.g., accuracy) may be made in the transmitter based on knowledge on both pixel distances and the viewing distance obtained from the receiver. In addition to better support for real-world like 3D interactions, the disclosed approach may bring savings in bitrate and corresponding costs.

FIG. 1A shows an example method 100 of viewing distance based resolution control of image data in an enhanced quality mode, in accordance with some embodiments of this disclosure.

At step 102, a computing device, such as a server, may receive a distance between a user and a display device. In an illustrative example 120, a user 122 may be viewing a display device 124. In the example shown in FIG. 1A, the display device 124 is a TV. In some embodiments, the display device 124 may a computer display or any external (flat) display, including digital signage display, for example.

The display device 124 may include a user tracking element or sensor that tracks a distance 125 between the user 122 and the display device 124. In some embodiments, the tracking element may be internal to the display device 124. In some embodiments, the tracking element may be a peripheral component that is associated with the display device 124. For example, the tracking element may provide the distance to the display device 124. The display device 124 may transmit the distance 125 to the server. The server may receive the distance 125 between the user 122 and the display device 124.

At step 104, the server may select, based at least in part on the distance 125 between the user and the device, a quality level for each layer of a plurality of layers of an image 126. For example, a quality level may refer to a resolution of each layer of the image. As an example, image 126 may be a (e.g., ultra-) high resolution image captured of the scene. For example, one approach to adjust image resolution may be to capture a scene with (ultra-) high resolution, and to lower it (e.g., to filter and decimate the image) for closer objects, for which a lower resolution is more adequate due to their larger scale. Controlling the decimation may use the depth map of each captured image e.g., by forming multiple focal plane images with different resolutions, or pixels with varying size (pitch) e.g., by applying a distance to sampling-frequency conversion (e.g., voltage to frequency). A challenge in the latter per-pixel-based approach may be to vary pixel sizes so that the image retains its size. In some embodiments, layers comprise of pixel level color information (textures) of a scene at different distances (depths) from a camera or a viewer, correspondingly when capturing data for transmission or receiving data for display. From a camera's and viewer's viewpoint, texture layers may contain from zero-to-several segments or objects of a scene, which are parts of the scene at different depths. Layer pixels not having texture information may be shown as transparent (e.g., not emitting light). Pixel distances may be indicated by gray scale values of a corresponding depth map. In some embodiments, enhancement layers contain details for the above texture layers, updating earlier coded and received data e.g., by increasing a layer's resolution or coding accuracy. Use of enhancement layers may reduce the overall amount of data for representing layers of a scene, correspondingly reducing the required bitrate.

In some embodiments, the server may have access to image data. For example, the server may access a pre-encoded version of each layer at different quality levels such as stored image content available at different resolution levels. For example, the image may be stored as layers at different resolution levels that a server may access. A version of each layer may be pre-encoded prior to transmission and stored. For example, a version of each layer may be stored as chunks identified by a manifest like in MPEG-DASH. The image data may comprise a frame of a video (e.g., 3D video) or other media content (e.g., 3D video game, 3D video conference, etc.). In another example, image data may be received from a camera or a sensor. In some embodiments, image data may include a texture of an image and depth data (depth map) for the image data. For example, the texture data may be a table comprising luminance and/or color (e.g., RGB, YCbCr, or other suitable color format) matrix, where each cell in the matrix represents brightness and color of a single pixel. The depth data may be a matrix (of the same size as the texture matrix) that defines depth for each of the pixels in the texture matrix. The image may be represented by a plurality of layers from the image data.

At step 106, the server may transmit a version of each layer at the selected quality level to the device to cause the device to reconstruct the image based on the transmitted version of each layer, and generate for display the reconstructed image. For example, the server may transmit a version of each layer 127 at the selected quality level to the display device 124 to cause the display device 124 to reconstruct the image based on the transmitted version of each layer, and generate for display the reconstructed image 128. In some embodiments, the accuracy (e.g., coding accuracy) of the human shown in the reconstructed image 128 can also be reduced (e.g., to a similar or different extent than the table) or increased. In some embodiments, the human shown in image 128 may have a coarser resolution that is similar to the resolution of the table shown in image 128, and the accuracy (e.g., coding accuracy) of the human may be reduced to a similar extent as the accuracy of the table shown in image 128.

In another illustrative example 140, the user 122 is at a different distance 145 to the display device 124. At step 104, the computing device, such as the server, may select, based at least in part on the distance 145 between the user 122 and the display device 124, a quality level for each layer of the image 126. At step 106, the server may transmit a version of each layer 147 at the selected quality level to the display device 124 to cause the display device 124 to reconstruct the image based on the transmitted version of each layer, and generate for display the reconstructed image 148. For example, as the user 122 gets closer to the display device 124, the resolution of the table shown in reconstructed image 148 is in higher resolution than the table shown in reconstructed image 128. In some embodiments, the human shown in image 128 may have a coarser resolution that is similar to the resolution of the table shown in image 128, and as the user 122 gets closer to the display device 124, the resolution of the human shown in reconstructed image 148 is in a higher resolution compared to the coarser resolution of the human in image 128.

In some embodiments, the method 100 may include causing the device to select a zoom level for the transmitted version of each layer of the plurality of layers of the image based on the distance between the user and the device, and modify each respective layer according to the selected zoom level. For example, the display device 124 may select a zoom level based on the distance between the user 122 and the display device 124. The display device 124 may modify each respective layer according to the selected zoom and reconstruct the image based on the modified version of each layer. Such embodiments may be referred to as a zoom mode.

In some embodiments, the method 100 may include causing the device to detect a lateral position of the user with respect to the device, and modify each respective layer according to the lateral position of the user to the device. For example, the display device 124 may detect a lateral position of the user with respect to the display device 124 and modify each respective layer according to the lateral position, and reconstruct the image based on the modified version of each layer. Such embodiments may be referred to as a panning mode.

FIG. 1B shows an example method 150 of viewing distance based resolution control of image data in a zoom mode, in accordance with some embodiments of this disclosure.

In some embodiments, step 152 of FIG. 1B is the same as step 102 of FIG. 1A. In In the illustrative example 160 of FIG. 1B, user 122 and display device 124 may be the same as those in FIG. 1A, except the user is viewing the display device 124 at a distance 165.

At step 154, the computing device, such as a server, may select, based at least in part on the distance 165 between the user and the display device 124 a zoom level for each layer of a plurality of layers of an image 166. As an example, the server may select a zoom level in a foreground layer that is higher or lower than a zoom level in a background layer (e.g., zooming in the foreground layer(s) more or less than background layer(s)). In some embodiments, each layer's size is compared to some reference size (e.g. the size of a closest MFP) instead of the layer's original size. In some embodiments, each layer's size is compared to the closest MFP, e.g., a 20% increase of all MFPs may mean sizes of $(1.2)^n \times$ <the first MFP size>, e.g. the zoom levels can be interpreted as different for each layer n. In some embodiments, the server may select a zoom level for a plurality of layers of an image 166 based on the distance 165 between the user and the device. For example, a zoom level may correspond to a scaling factor. In some embodiments, the server modifies each respective layer according to the selected zoom level. For example, modifying each respective layer according to the selected zoom level may refer to cropping and scaling of a portion of each layer of the image. For example, a cropping window is shown in a dotted line in image 166. The portion of the image 166 in the cropping window can be scaled (e.g., at the selected scaling factor) to fill a display area of the display device 124. The scaling may be inversely proportional to the viewing distance 165. In some embodiments, the plurality of layers are multiple focal planes, and the magnification is made by scaling each multiple focal plane by a scaling factor (e.g., factor of k) and after the magnification is made, cropping each focal plane by the frustum defined by the display edges.

At step 156, the server may transmit a version of each layer at the selected zoom level to the device to cause the device to reconstruct the image based on the transmitted version of each layer, and generate for display the reconstructed image. For example, the server may transmit a version of each layer 167 at the selected zoom level to the display device 124 to cause the display device 124 to reconstruct the image based on the transmitted version of each layer and generate for display the reconstructed image 168. The image 168 shows a zoomed in version of image 166.

FIG. 1C shows an example method 170 of viewing distance based resolution control of image data with panning in a zoom mode, in accordance with some embodiments of this disclosure. In some embodiments, the steps of method 170 may continue from steps of method 100 of FIG. 1A and/or steps of method 150 of FIG. 1B.

At step 172, method 170 includes receiving, at the computing device, such as a server, a lateral position 195 of the user with respect to the display device 124. For example, display device 124 may include a tracking element or sensor that tracks a lateral position of a user. In some embodiments, the tracking element may be internal to the display device 124. In some embodiments, the tracking element may be a peripheral component that is associated with the display device 124. For example, the tracking element may provide a lateral position of the user with respect to the display device 124. The display device 124 may transmit the lateral position 195 to the server. The server may receive the lateral position 195.

At step 174, the server adjusts the version of each layer based on the lateral position of the user. For example, the version of each layer 167 at the selected zoom level of FIG. 1B may be adjusted to the version of each layer 197 based on the lateral position of the user in FIG. 1C. The version of each layer 167 may be adjusted to be cropped to a different window. For example, the user 122 may have shifted to the right in position in FIG. 1C from a central position in FIG. 1B. Accordingly, instead of using the cropping window shown by the dotted line in image 166 of FIG. 1B, the server adjusts the versions of each layer based on the cropping window as shown by the dotted line in image 196 of FIG. 1C which is shifted to the right.

At step 176, the server transmits the version of each layer adjusted based on the lateral position of the user to cause the device to reconstruct the image based on the transmitted version of each layer, and generate for display the reconstructed image. For example, the server may transmit a version of each layer 197 adjusted based on the lateral position of the user 195 to cause the display device 124 to reconstruct the image based on the transmitted version of each layer and generate for display the reconstructed image 198. The image 198 shows a zoomed in version of image 196 that is panned to the right.

In the embodiments described above in FIGS. 1A-C, the image is displayed on a 2D display. For example, layers of the image may be multiple focal planes (MFPs) that are summed up pixel by pixel for a 2D display.

In other embodiments, the image is displayed on an MFP display. For example, the image may be displayed using a stack of transparent displays and/or using of spatial light modulators (SLMs) that are capable of rendering image content to varying distances, controlled by tailored phase functions. For example, the layers may be displayed optically at different distances, and a viewer's eyes sum up light intensities of the MFPs rendered optically at different distances.

The term "spatial light modulator" ("SLM") device refers to any suitable programmable pixel-by-pixel spatial light modulator device or any other suitable opto-electronic device or device component capable of locally directing and focusing light to different depths. In some embodiments, an SLM device works by directing light pixel by pixel, however other less precise SLM device may also be used. In some embodiments, an SLM device may also refer to a grid of parallel SLMs, or a series of SLMs rendering content in successive steps.

FIGS. 1A-C show user interaction with a TV or flat screen. An example use case for seeing content details on a TV or flat screen is as follows. The display (e.g., a TV set) is fixed, and the viewer makes the zooming interaction by approaching/drawing away from the display. A user's axial movements (to/from the TV) control magnification. A user's sideways movements control panning. Such an approach enables more natural and intuitive way(s) to watch TV. In some embodiments, a user may watch TV while standing and may move to interact with the TV. In some embodiments, a magnifying effect may be used as an eye-catcher for bypassing persons. For example, as a person passes a display, a magnifying effect may be used with an advertisement or remark on the display for that content to stick out. In some embodiments, the approach may be used in digital signage.

Figure 2A:
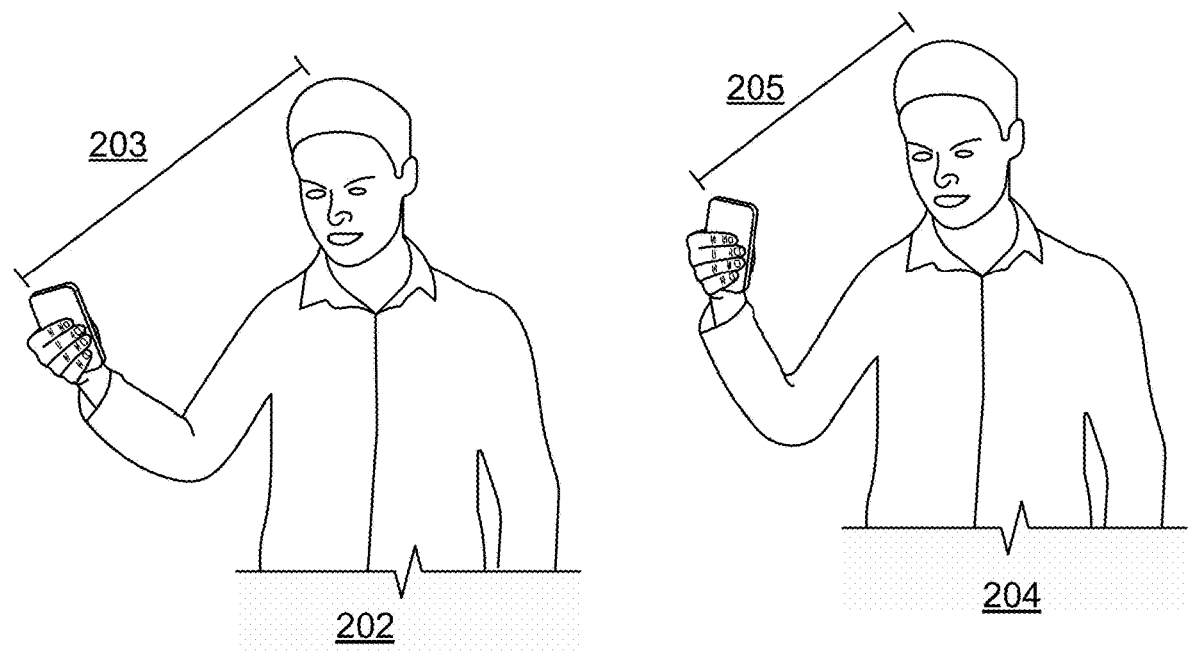
FIG. 2A shows an example interaction in mobile viewing, in accordance with some embodiments of this disclosure.
Figure 2B:
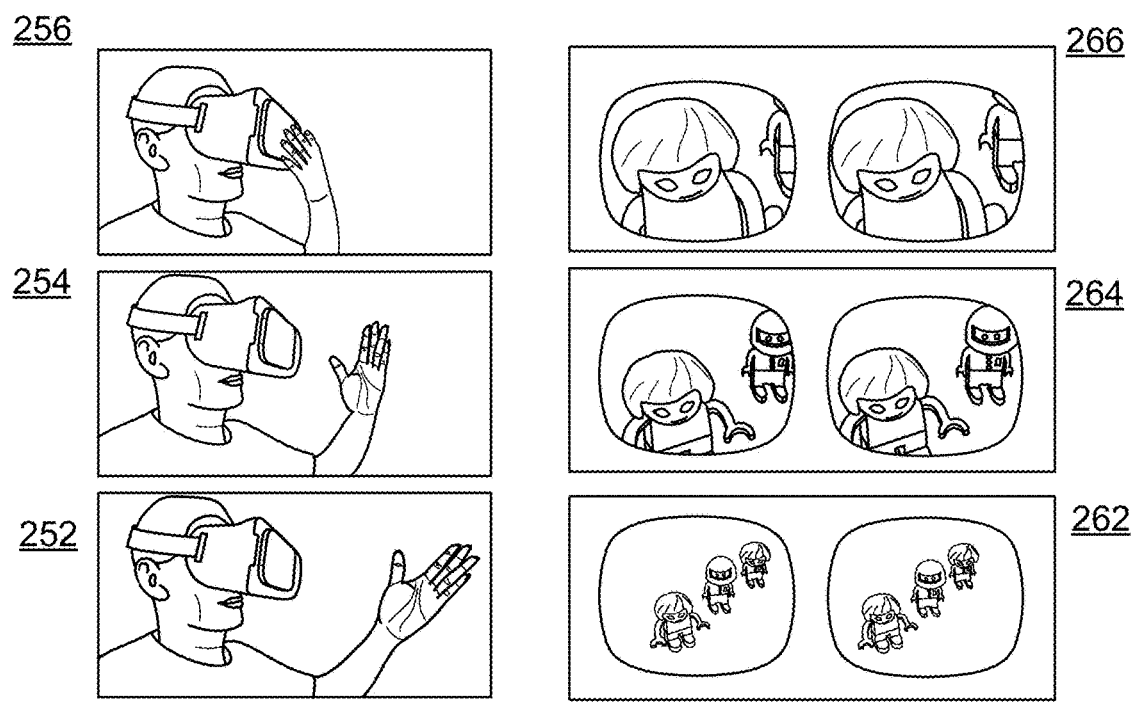
FIG. 2B shows an example of interaction with VR glasses, in accordance with some embodiments of this disclosure.

In some embodiments, the example methods 100, 150, and 170 of FIGS. 1A-C may be applied to user interaction with other devices such as a computer display, a mobile device or other handheld device, or an extended reality (XR) device. FIGS. 2A-B show other types of interactions of a user with a mobile phone or XR device.

FIG. 2A shows an example interaction in mobile viewing, in accordance with some embodiments of this disclosure. Mobile viewing may refer to viewing images by a cell phone or a tablet. Such a viewing is analogous to but dualistic to the above use case for TV and flat screens. Instead of a user moving with respect to the display, the display may move with respect to the user. An example use case for seeing content details on a handheld or mobile device is as follows. Mobile viewing is dualistic to TV case, having device mobility instead of user mobility. When holding a mobile display as shown in 202, for example at an arm's length away (e.g., distance 203), the content may be shown in a default mode such as a wide view without cropping or adjusting the resolution. When bringing the mobile display closer as shown in 204 (e.g., distance 205), either an enhanced quality mode or a zoom mode (e.g., a magnifying glass option, magnify mode) may be used. In an enhanced quality mode, the image size is kept constant like the size of a real-world object. In a magnifying glass option, the effect of a magnifying glass is synthesized. For example, the view is zoomed in (magnified and cropped). The hand-held mobile display may be tracked in distance either using the camera view towards the user (front camera) or using the view away from the user (back camera), or both (e.g., for stability), and may also use electronic sensors (e.g. inertial measurement unit (IMU)) for increasing stability.

FIG. 2B shows an example interaction with VR glasses, in accordance with some embodiments of this disclosure. The interaction with VR glasses can be hand gestures in front of a camera that is embedded in the VR glasses. For example, resolution and size of an image displayed on VR glasses may increase as the hand moves closer to the glasses. For example, in frame 252, a user has his hand at a distance that is far away from VR glasses and corresponding image that is displayed on VR glasses is shown in frame 262. In frame 254, the user moves his hand closer to the VR glasses, and the corresponding image displayed on VR glasses is shown frame 264, which may be higher in resolution and size than the image shown in frame 262. For example, frame 264 may show an image in more detail and zoomed in (and cropped to fit the size of the display of the VR glasses) than frame 262. In frame 256, the user moves his hand much closer to the VR glasses, and the corresponding image displayed on VR glasses is shown in frame 266, which may be higher in resolution and size than the image shown in 264. For example, frame 266 may show an image in more detail and zoomed in (and cropped to fit the size of the display of the VR glasses) than frame 264. The rate of magnification may be set, for example, according to a user preference. A panning function may be controlled by sideways (transversal) motions of the hand.

In some embodiments, a panning mode may be supported on a device (e.g., TV of FIGS. 1A-C, mobile phone or a XR device of FIGS. 2A-B, or any suitable display device) based on an eye gaze of a user. For example, a device may detect an eye gaze of a user as a lateral position of the user to the device. For example, a user may provide an initial user interaction to indicate that eye gaze should be used to control panning. The initial user interaction may be a user selection that a panning mode is entered (e.g., eye blink, finger movement, voice command, etc.). After the initial user interaction, the device may track an eye gaze to control panning. The user may provide another user interaction (e.g., eye blink, finger movement, voice command, etc.) to release the eye gaze for further viewing of the image.

In the disclosed approach, higher resolutions are supported for distant features (pixels). This enables seeing a display from closer to see content with better accuracy. Controlling content resolution (more generally accuracy) may be made by the encoder and takes both the pixels' distances (depth) and its viewing distance into account. The approach may be based on a video plus depth (texture plus depth map) format. To save in bitrate and costs, detail updates can be received based on a viewer's distance from the display. Supporting details may enable real-world like 3D interactions based on high resolution 2D content.

For example, a captured video frame (texture) may be decomposed by the sc. depth blending into a reduced set of depth ranges, each represented by a specific (multi-) focal plane (MFP). Alternative approaches may be used, such as those based on more fine-grained depth values and resolutions (as an asymptote, even a different pixel size corresponding each depth value).

MFPs may be rendered at specific distances into a viewer's viewing frustum. MFPs may be used to support natural accommodation/eye focus. In the disclosed approach, MFPs may be used to decompose each view into a manageable set of depth-based images, which are coded with varying resolutions/accuracy depending on the viewer's viewing distance. Correspondingly, the disclosed approach is a multi-resolution approach.

In the present disclosure, a viewing distance from a display may define a variety of parameters, such as the apparent size of the display perceived by the viewer (e.g., the viewing angle or the viewing frustum for the display), the size of each focal plane inside the viewing frustum, and the resolution at each distance. The present disclosure further provides that options for adjusting rendering size by a viewing distance may include (1) enhanced quality paradigm and (2) magnifying glass paradigm. In the enhanced quality paradigm, rendering size may not be changed when the viewer approaches/diverges from the display. In a glasses/NED option, the rendering size and distance may be virtual. The enhanced quality paradigm may comply with seeing objects/views in the real-world. The enhanced quality paradigm may enable sharing a screen by multiple viewers, as any one viewer may not determine/change the rendering size. In a magnifying glass paradigm, the rendering size may be magnified when a viewer approaches the display. The magnifying glass paradigm may help with seeing details and may enable more motion-based interactions.

The size of the rendering may be adjusted in the receiver based on a viewer's distance from his/her display. However, adjusting the resolution may be made in the encoder, to optimize transmission, e.g., having a lower bitrate when transmitting MFPs with reduced resolutions. If a viewer's motions are moderate, the delay in receiving his/her viewing distance from the receiver may be small enough to serve him/her in a timely manner with an adjusted quality. Low latency networks, e.g., 5G, may be used.

In the disclosed approach, adjusting MFP resolutions in the encoder may be based on choosing a reference or nominal distance both for the MFPs and an assumed display. In one embodiment, the closest MFP is chosen to reside at the nominal viewing distance for a display, e.g., a TV set. Correspondingly, the other MFPs reside at chosen spacings behind the display. Note in particular, that the choice of distances for MFPs resulting from the decomposition may be different from the corresponding distances for accommodative or stereoscopic rendering.

In a receiver, the real viewing distance depends on a viewer's personal preference and the sizes of his/her display and the viewing space. When adjusting magnification in the receiver, the real viewing distance may be different from the distance assumed in the transmitter. This difference may be ignored, as a viewer may control the perception of resolutions and magnification (in the magnifying mode) according to his/her personal preference. In one embodiment, support for communicating the real display size, real viewing distance, and other possible parameters from a receiver to a transmitter may be included into a system implementation.

FIG. 3 depicts examples of an enhanced quality mode and a magnifying mode for viewing distance based resolution control of image data, in accordance with some embodiments of this disclosure. FIG. 3 illustrates the two basic modes (viewing paradigms) supported by the approach, namely an enhanced quality mode shown in column 310 and a magnifying mode shown in column 320. As illustrated by a user's motion in column 302, both modes are dependent on the viewer's distance from the display.

FIG. 3 shows in column 302 a viewer's position with respect to a display (e.g., TV), in column 310 the corresponding enhanced quality viewing without scaling, and in column 320 the corresponding scaling when using the magnifying glass paradigm. In column 320, a sub-view is shown of the original wide view 305. In FIG. 3, the original wide view 305 is shown as outlined with a dotted line in column 320. In both modes, the resolution of the content is selectively adjusted depending on the viewer's distance.

In the enhanced quality mode shown in column 310, real-world like perception is supported by increasing the accuracy (e.g., resolution) when a viewer approaches objects/details of a 2D display.

Figure 7A:
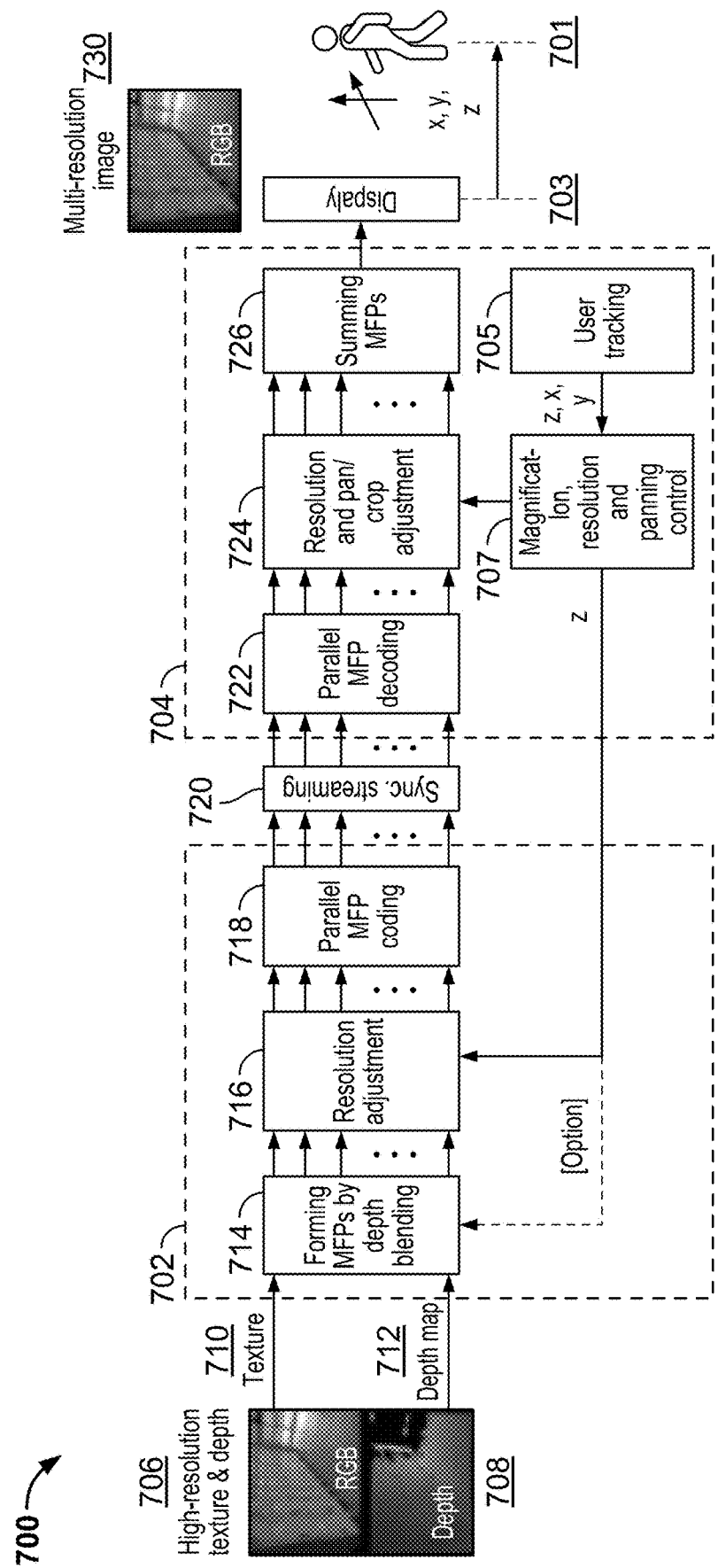
FIG. 7A depicts a system for transmitting and receiving image data, in accordance with some embodiments of this disclosure.
Figure 7B:
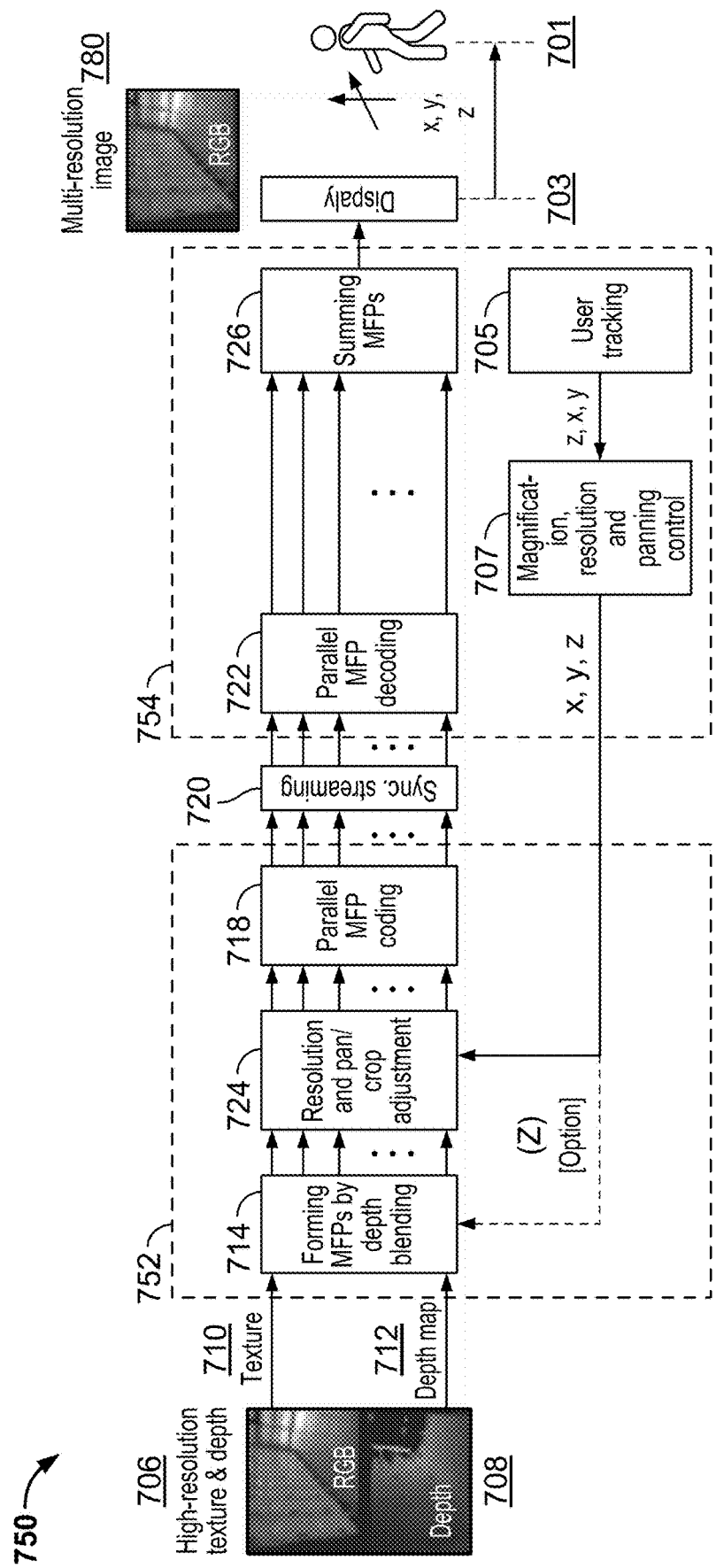
FIG. 7B depicts a system for transmitting and receiving image data, in accordance with some embodiments of this disclosure.

The magnifying mode shown in column 320 supports additional scaling of the content when a viewer moves closer to the display. Magnification can be made in the transmitter or the receiver. In some embodiments, magnification is made in the receiver. This scaling can be supported by corresponding functions in the receiver. In some embodiments, magnification is made in the transmitter. This scaling can be supported by corresponding functions in the transmitter. If the magnification is made in the transmitter (e.g., encoder), the possible bitrate saving of cropping the image can be taken into account. On the other hand, controlling the magnification at the receiver (e.g., decoder) makes the adjustment more immediate for the viewer, and avoids possible disturbances caused by two-way (round trip) latencies in the network. Controlling magnification at the receiver also avoids the need for sending data on a viewer's sideways movements when panning in the view. The description of FIGS. 7A and 7B provide examples of supporting magnification in the receiver and the transmitter, respectively.

As a result of the above multi-resolution approach(es), real-world like and/or enhanced perception can be supported with 2D content, and bitrates and costs can be reduced.

FIG. 4 shows an illustration of interactive panning in the magnifying mode. Cropping the view (MFPs) in the magnifying mode enables a further motion-based interaction for the viewer. The viewer can namely move the cropped sub-image in the original uncropped view by sideways (translative) movements. This user interaction corresponds to panning with a camera in a physical view. For example, FIG. 4 shows at 402 that a user may move in a lateral direction (e.g., x and y direction) relative to a display. FIG. 4 shows at 403 examples of corresponding lateral movements of the cropped sub-image in the display.

An example policy for controlling panning in the magnifying mode may include the following: while magnifying the view (zooming-in), the cropped view may be kept centered with the enhanced quality wide view; the enlarged sub-view can be moved sideways in the enhanced quality view by tracking the viewer; and zooming out may normalize the view (returns a view to the un-cropped/wide mode). Panning and zooming, together with resolution enhancement, may enable a user to interactively select an area of interest in the received and viewed content, and to see its details better than in existing content services.

By providing high resolution for distant details/objects, the disclosed approach enables a viewer to interact with content by motions (either the viewer's or display's), to see details from close, and even to magnify the view. Correspondingly, lowering the resolution of nearby objects without unduly sacrificing their quality, reduces bits, computations, and corresponding costs.

One approach to adjust image resolution may be to capture a scene with (ultra-) high resolution, and to lower it (e.g., to filter and decimate the image) for closer objects, for which a lower resolution is more adequate due to their larger scale. Controlling the decimation may use the depth map of each captured image, e.g., by applying a distance to sampling-frequency conversion (e.g., voltage to frequency). A challenge in this per-pixel-based approach may be to vary pixel sizes so that at the image retains its size.

Another approach is to decompose an ultra-high-resolution input image to a chosen number of focal planes (MFPs formed by pixels in specific distance ranges) using depth blending, and to decimate the focal planes inversely to their distances from the viewer. For example, MFPs may be formed by traditional linear depth blending (e.g., as described in Akeley, Kurt, et al. "A stereo display prototype with multiple focal distances," ACM transactions on graphics (TOG) 23.3 (2004): 804-813, which is herein incorporated by reference in its entirety). The closer the focal plane is, the lower is its resolution (if their quality remains adequate due to the large scale of close objects).

Figure 5:
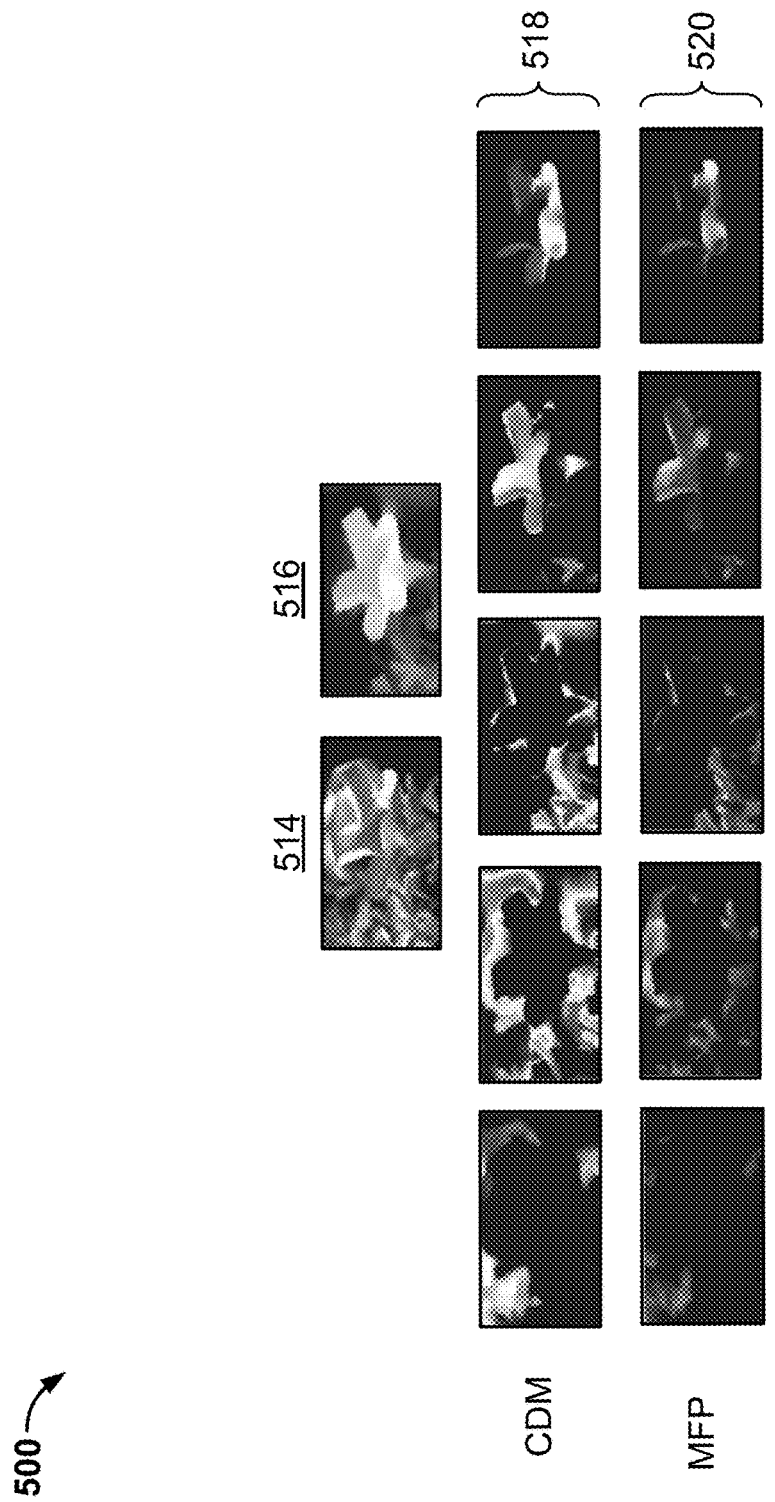
FIG. 5 shows an example of decomposing an image into MFPs, in accordance with some embodiments of this disclosure.

FIG. 5 gives an example for decomposing an image into MFPs. For example, a texture image 514 is decomposed into five MFPs in lowest row 520. A depth map 516 is decomposed into five component depth maps (CDMs) in the middle row 518 using depth blending with five linear (sc. tent) filters. The CDMs are then used to weight the texture image to obtain MFPs in row 520.

The number of MFPs is selected to support a chosen granularity (in depth dimension) for the resolution adjustment. Depth blending is made using a set of weighting functions (filters) which fulfil the sc. partition of unity property. Weighting decomposes a depth map 516 into component depth maps (CDMs) in the middle row 518. CDMs are then used to weight the texture image to obtain MFPs in the lowest row 520. Resulting from the partition of unity property, the sum of CDMs is unity (here: a fully saturated image). There is a large number of options for the weighting functions, producing MFPs with different properties. An option may be selected according to set preferences.

Decomposing a captured image to MFPs eases up setting individual resolutions and accuracy to a manageable set of component images. In addition to easing up the implementation, it also helps to describe and understand the approach. Thus, in the described approach, an input image is assumed to be decomposed into multiple focal planes (MFP) representing the view at discrete distances, instead of using pixels at more continuous/diverse distances. Correspondingly, adjusting the resolution is made for the MFPs.

Depth blending produces focal planes, where contents or objects are gradually blended between neighboring focal planes, depending on their positions in depth. This use of depth blending may produce less bits when compressing the content for transmission.

Another means is to use for example, box filtering, which means that image pixels are mapped to the closest focal plane in the decomposition. This produces more abrupt changes in focal plane contents, which may result with higher bitrates in compression. Also summing box-filtered focal planes gives the original image as the result, e.g., box filters fulfil the partition of unity property. In one embodiment, the disclosed approach uses box filters for decomposing images.

One principle in adjusting resolutions for MFPs is to retain a constant accuracy for the MFPs during user motions that may change a viewing distance. A resolution may be increased when a viewing distance shortens. Note that in 2D rendering, resolution may typically be constant regardless of the viewing distance, e.g., the perceived accuracy degrades when a display is viewed from closer (e.g., an image pixelates).

One example approach for adjusting resolution may be described as follows. A chosen number of focal planes (MFPs) may be formed. Resolutions of MFPs may be adjusted higher when a viewer approaches a display, the viewing frustum may get wider (opens) for closer distances, and sizes of more distant MFPs may increase more. See, for example, FIGS. 6A and 6B with their explanations. The resolution of an MFP may be set based on the size of the MFP in the viewing frustum. For example, the size and shape of pixels (pixel pitch) may be kept constant. As another example, fourfold size implies or results in fourfold resolution. After scaling the resolutions, focal planes may be rendered into a viewer's viewing frustum.

Resolution of MFPs may be defined either from front to back, or vice versa, such as by using either 1) the frontmost MFP (minimum resolution), or 2) the backmost MFP (maximum resolution) as a reference. The maximum resolution may be limited, for example, by the system capability and the minimum resolution by what is considered acceptable.

Figure 6A:
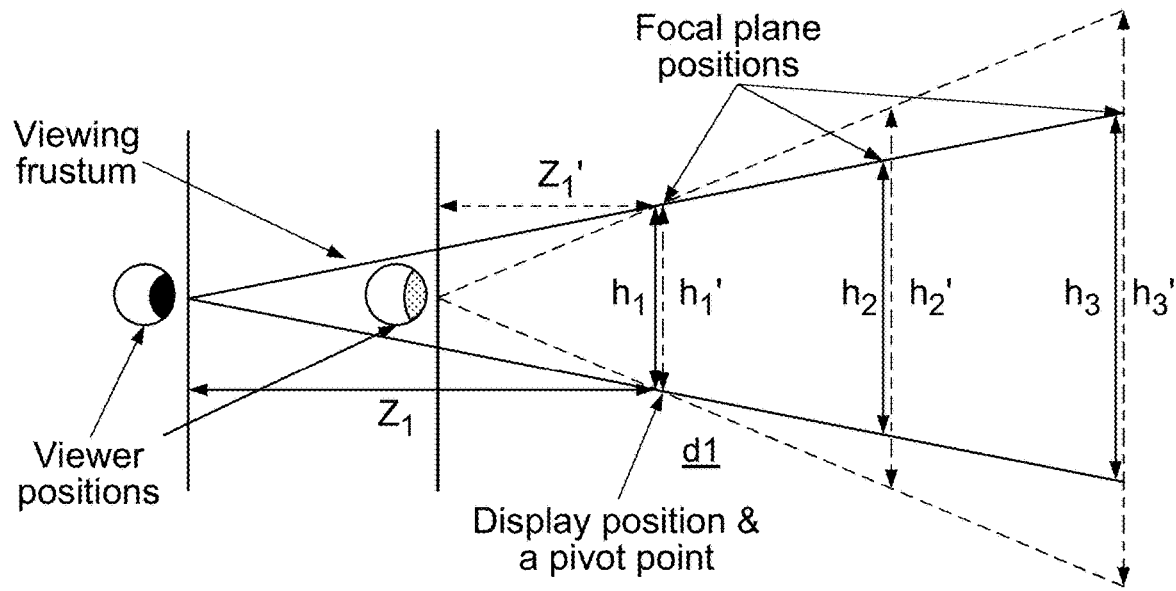
FIG. 6A shows an example of adjusting scale and resolution of MFPs in the enhanced quality viewing mode, in accordance with some embodiments of this disclosure.

FIG. 6A shows an example of adjusting scale and resolution of MFPs in the enhanced quality viewing mode, in accordance with some embodiments of this disclosure.

In the following, policies for adjusting the resolutions of MFPs are described more in detail both for enhanced quality and magnified modes (paradigms). In the enhanced quality viewing mode, the size of the rendering is kept fixed on the display regardless of a viewer's position (for example, an object in the real-world). However, the resolution may be adjusted to support interactions by motions.

In the following, for simplicity and as an option, the resolution control assumes that each image is decomposed into a set of MFPs at discrete distances. Decomposing a view to as many MFPs as there are different pixel distances is an asymptotic case and may be supported by some embodiments.

An example policy for the scale and resolution adjustment may be described as follows. MFPs may represent the scene at discrete distances from a camera/viewer. The display (for example, the closest focal plane at d1) may define the rendering size depending on a viewer's distance (for example, z1 and z1'). Other focal planes may be defined by the geometry, and their separations may be kept unchanged during viewer motions (retaining the perceived depth). Focal plane sizes may be determined by the viewing frustum going through the display. When the viewer moves, the facets of the viewing frustum may be pivoting around display edges. Each focal plane resolution may be adjusted by its changed size, while keeping the pixel size(s) fixed.

In the example approach, the closest focal plane is chosen/assumed to reside at the distance of the display z1. Note that locking MFP distances may be made also at some other reference distance(s).

Figure 6B:
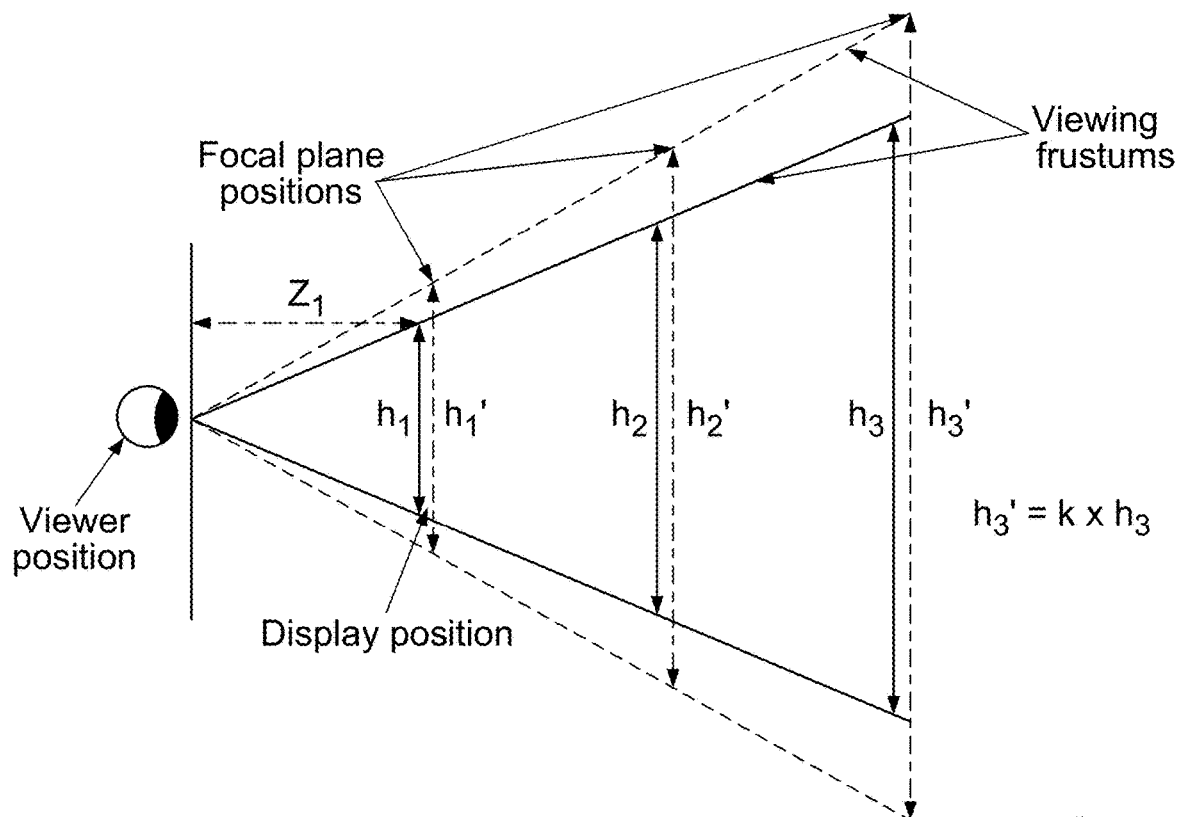
FIG. 6B shows an example of adjusting scale and resolution of MFPs in the magnifying mode, in accordance with some embodiments of this disclosure.

Note that in FIGS. 6A and 6B, the two ended arrows indicating focal plane sizes at a focal plane position are drawn beside each other just for clarity—in real the arrows reside at same distances (over each other).

FIG. 6B shows an example of adjusting scale and resolution of MFPs in the magnifying mode, in accordance with some embodiments of this disclosure. In some embodiments, the magnifying mode is referred to as a zoom mode.

Adjusting the magnification is relevant in the magnifying glass mode/paradigm. In the magnifying mode, the image size on a display is increased when a viewer approaches the display. The rate of this increase may be chosen for the system and/or set according to a viewer's preference.

If the magnification is made in the encoder, the possible bitrate saving of cropping the image can be taken into account. On the other hand, controlling the magnification at the receiver makes the adjustment more immediate for the viewer, and avoids possible disturbances caused by two-way (round trip) latencies in the network. Controlling magnification at the receiver also avoids the need for sending data on a viewer's sideways movements when panning in the view.

Magnification may be made in the transmitter or the receiver. In some embodiments, magnification is made in the transmitter. In some embodiments, magnification is made in the receiver. The description of FIGS. 7A and 7B provide examples of the options.

An example policy for the scale and resolution adjustment in the magnifying mode may be described as follows. The policy may be considered as an add-on to enhanced quality viewing, e.g., it enlarges focal planes more when a viewer approaches the display. Magnification may be made by scaling the adjusted focal planes additionally by a factor k. Factor k may be inversely proportional to the viewing distance (z1), and may be chosen to produce a desired rate for the scaling. For distances greater than a chosen maximum, or smaller than a chosen minimum, the scaling may be saturated or stopped to prevent excessive cropping or even pixelation of the view at short distances, or fix the view for large distances (e.g., when watching TV). After additional magnification, each focal plane may be cropped by the frustum defined by display edges Scaling factor k defines the strength of the magnifying effect and can be chosen as preferred. For all focal planes heights $h_i$, the corresponding scaled heights are $h_i'=k \times h_i$. Focal plane widths are obtained similarly.

Focal planes decompose an image into components which, when summed up, result the original image. This results from the sc. partition of unity property of depth blending functions.

MFPs may be of the same resolution as the original image. In the disclosed approach, however, the resolution of each MFP is adjusted individually, based on its distances from the viewer. The disclosed approach may result with more optimized use of network capacity (lower average bitrate) compared to other approaches.

Summing up image components with different resolutions may require the use of a sc. super-resolution approach (e.g., such as those from remote sensing applications). For example, use of a super-resolution approach in remote sensing applications may be described in Wu, Tao et al. "A Study on Fusion of Different Resolution Images." Procedia Engineering 29 (2012): 3980-3985, which is herein incorporated by reference in its entirety. Images (here MFPs) with different resolutions can be summed up after rescaling them into same (high) resolution. Unlike in remote sensing, where fused images often originate from various sources and need pre-alignment for their contents (e.g., by object recognition and pattern matching), MFPs are in the disclosed approach readily aligned and thus easier to fuse. When rendering MFPs for a monoscopic, non-accommodative display, MFPs can be summed up in the one size they appear from the viewer's eyepoint. Summing up MFPs may result in a super-resolution image, e.g., an image with better accuracy than any of its components.

In the enhanced quality mode, fusing may be made for full-sized MFPs. In the magnifying mode, the fusing (rescaling and summing) may be made for the cropped and panned areas of the MFPs.

As the resolutions of the MFPs have been formed for varying distances, the disclosed approach enables approaching objects on the display and seeing their details and saving bits when diverging the display and using low resolutions.

FIG. 7A depicts a system 700 for transmitting and receiving image data, in accordance with some embodiments of this disclosure. FIG. 7A includes a server 702 and a client 704. In some embodiments, the server 702 may be referred to as a transmitter/encoder, and client 704 may be referred to as receiver/decoder.

The client 704 may have a user tracking module 705 and a magnification, resolution, and panning control module 707. The user tracking module 705 may detect a position (x,y) and distance (z) of a user 701 from a display 703. The control module 707 may receive the (x,y,z) data from the user tracking module 705. In some embodiments, the control module 707 may receive user input data indicating when an enhanced quality mode or a magnify mode is used. For example, user input data may be input directly by the user. In some embodiments, the user input data may be a user preference that is stored.

In the shown embodiment, server 702 (e.g., when executing the codec application) may access image data including texture data 706 and depth data 708. The image data may be accessed in the local database, provided by a sensor, or received from another remote device.

At 714, texture data 706 may be transmitted 710 and a depth map 708 may be transmitted 712 and formed 714 into MFPs by depth blending. For example, a high resolution or an ultra-high resolution may be used for the image (and corresponding depth) capture, and a lower resolution may be formed and used for an MFP. The lower resolution may be used whenever possible without noticeably degrading the viewing experience.

A number of MFPs may be formed e.g., by depth blending. The number may be chosen to support an adequate perception for depth with acceptable complexity. Around six MFPs may be adequate to support high enough fidelity for accommodation. In some embodiments, a different number of MFP may be used (e.g., 3, 4, 5, 7 or more). In the disclosed approach, MFPs may not be rendered in depth, unless an accommodative display is used. The number of MFPs in the disclosed approach may be restricted by the need of fusing MFPs with pixel sizes (pitches) varying on a sub-pixel level. In some embodiments, the number of MFPs may be any suitable number of MFPs (e.g., 2, 3 or more).

At 716, the resolution of the MFPs may be adjusted in the server 702, where lowering the resolution may reduce the number of bits resulting from compressing the corresponding MFPs. Resolutions of MFPs may be adjusted based on the viewing distance obtained from the receiver, e.g., using example approaches described above in the detailed description of FIGS. 5 and 6A.

In one example approach, the closest focal plane is chosen/assumed to reside at the distance of the display z1. This assumption may be the same both in the transmitter and receiver. Correspondingly, MFP distances may not be explicitly shared over the network. Resolutions of MFPs may be defined based on the same tracked viewing distance both in the transmitter and receiver. In one embodiment, the viewing distance may affect choosing MFP positions in the server 702. For example, the viewing distance to element 714 for forming MFPs is marked as optional in FIG. 7A, and in some embodiments the viewing distance may affect the forming of MFPs by depth blending.

At 718, the server 702 performs parallel coding of MFPs generated at step 716. For example, a coding stream may be generated based on each respective MFP generated. In FIG. 7A, only one texture and depth map frame are shown as input. However, the input may be a sequence of such frames, and correspondingly MFPs form parallel streams of images for which both interframe and intraframe coding and decoding methods can be applied. Any suitable lossless or lossy encoding techniques may be used for each stream (e.g., MPEG, HLS, DivX, etc.). In some embodiments, any suitable protocols and tools (e.g., wrappers or containers) may be used. For example, to code data, server 702 may use one or more of Secure Reliable Transport (SRT), Dynamic Adaptive Streaming over HTTP (MPEG-DASH), Real-Time Messaging Protocol (RTMP), Audio Video Interleave (AVI), any other suitable protocol, or any combination of the above.

In some embodiments, the MFP streams are coded 718 by server 702 in parallel fashion. For example, streams are marked with markers (e.g., timestamps and labels in their headers) that allows MFPs of the same frame to be collected together.

In some embodiments, MFPs with varying resolutions are coded in parallel with a video compressing approach. This approach keeps content readily in a decomposed form for the server 702 and simplifies scaling of the content depending on a viewer's distance from the display. However, in alternative embodiments, the content may be changed to some other format for coding and transmission, and after decoding the content by the client, the decoded content may be returned to the decomposed format for further processing.

Figure 9:
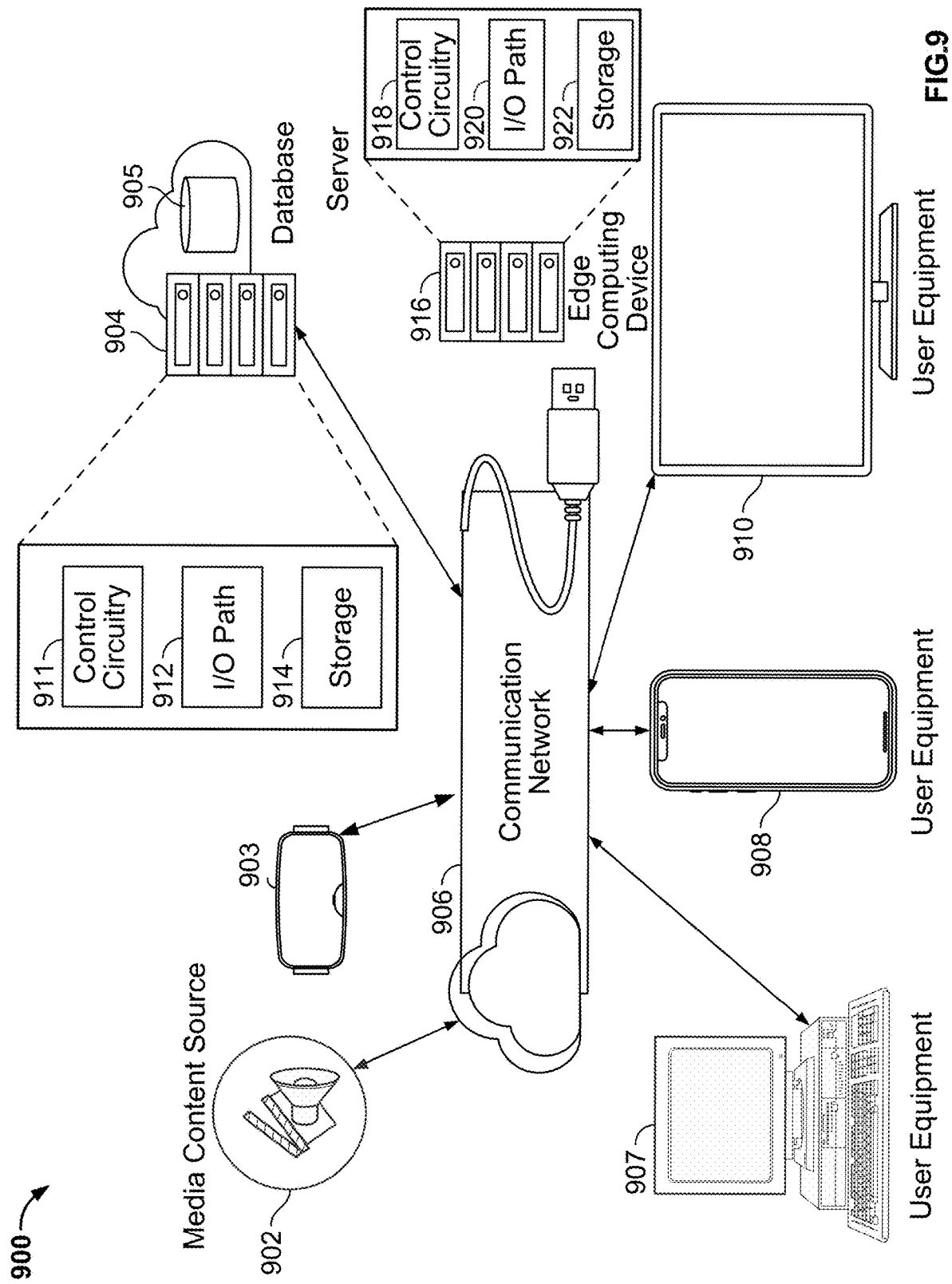
FIG. 9 is a diagram of an illustrative system for encoding/decoding, in accordance with some embodiments of this disclosure

Once encoding is complete, server 702 may transmit 720 the encoded data over any kind of a network (e.g., network 906 of FIG. 9). For example, the streaming may occur from a server 702 to client 704 (e.g., a mobile device or head-mounted display, or any other suitable client device).

Stream 720 causes client 704 to decode and display an image based on recovered MFPs. For example, client 704 may decode 722 (e.g., using any suitable codec) the multiple parallel MFP streams. At 724, the client 704 adjusts the resolution and pan/crop of the decoded MFPs. After decoding 722 the data for received MFPs, the data cropping (zoom and pan) is adjusted 724 if a magnifying mode is used. Cropping uses the knowledge of both the distance (z) and sideways positions (x, y) of the viewer, obtained from a user tracking module 705. The user tracking module 705 may use both image features and electronic means for deriving the position parameters. Specifically, the tracking solutions of a mobile device (e.g., a cell phone or VR glasses) may be used in case it is used for viewing.

MFPs can be summed up after first upscaling them to a mutual ultra-high resolution. In FIGS. 7A-B, this is assumed to made in the summing block. As MFPs are here not (primarily) used for supporting an accommodative display, the summing is made directly as an arithmetic operation—without, e.g., optically rendering (and resizing) MFPs in different accommodation distances—to obtain a reconstructed image with its accuracy varying by the viewing distance. Virtual distances of MFP pixels from the viewer may be known by the system.

In both enhanced quality and magnifying modes, approaching the display is supported by selectively increasing the resolution and accuracy of the content. Adjusting the resolution is most feasibly made by the transmitter, based on the viewing distance tracked and sent to the transmitter by the receiver. This is necessary in order for the encoder to adjust the bitrate correspondingly. Due to variations in network delay, adjusting the resolution over network may cause some variations of pixel quality. Note that for a human eye, temporal variations on pixel size may not be as easy to detect as errors caused e.g., by lags in image compression.

Adjusting the rendering scale can be made either in the transmitter or receiver, as the viewing distance for defining the scale is available at both ends. The benefit of adjusting the scale in the transmitter is that cropping MFPs may reduce the bitrate for their transmission. However, adjusting the scale in the receiver may be beneficial for avoiding possible latencies, and correspondingly increasing the rendering stability. Note that when cropping in the transmitter, geometric/spatial instability caused by a varying network latency is likely more disturbing than errors in plain quality/resolution adjustment.

Adjusting the resolutions of focal planes is a way to affect image quality. Note that in addition to resolutions, also coding (compression) quality can be adjusted based on the tracked viewing distance. For example, coding (compression) quality may be used in an approach as described in U.S. patent application Ser. No. 18/088,397, "MULTI-FORMAT REPRESENTATION AND CODING OF VISUAL INFORMATION", which is herein incorporated by reference in its entirety.

FIG. 7B depicts a system 750 for transmitting and receiving image data, in accordance with some embodiments of this disclosure. The system 750 of FIG. 7B is similar to the system 700 of FIG. 7A, except that server 752 of FIG. 7B includes a resolution and pan/crop adjustment element 724 in place of resolution adjustment element 716 of server 702 of FIG. 7A; client 754 of FIG. 7B does not include the resolution and pan/crop adjustment element 724 that is included in client 704 of FIG. 7A; and magnification, resolution and panning control element 707 may provide lateral position and viewing distance information (x, y, z) in FIG. 7A instead of viewing distance information (z) in FIG. 7B. In some embodiments, the panning control element 707 may be included in the server 752 instead of the client 754. In some embodiments, the server 752 may be referred to as a transmitter/encoder, and client 754 may be referred to as receiver/decoder.

In some embodiments, although not shown in FIGS. 7A and 7B, the client 704 provides image data to a display 703 that is an MFP display. In such embodiments, element 726 of summing the MFPs is optional, and the client 704 may directly use MFPs to generate for display a multiresolution image on the MFP display.

Figure 8:
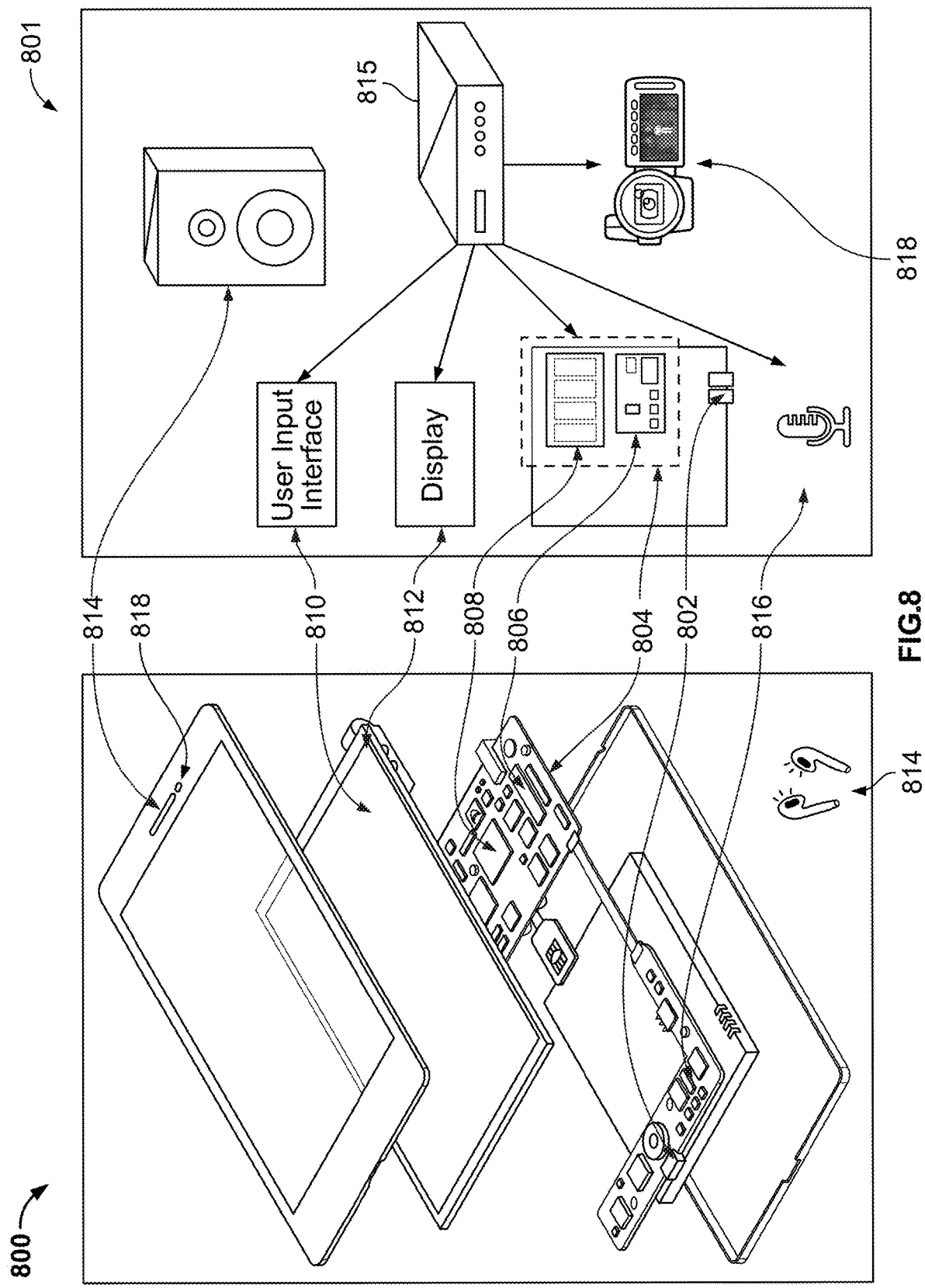
FIG. 8 shows generalized embodiments of illustrative user equipment devices which may perform the functions described herein.

FIGS. 8-9 depict illustrative devices, systems, servers, and related hardware for image encoding/decoding. FIG. 8 shows generalized embodiments of illustrative user equipment devices which may perform the functions described herein. User equipment device 800 may be a smartphone device, a tablet, a virtual reality or augmented reality device, or any other suitable device capable of processing video data. In another example, user equipment device 801 may be a user television equipment system or device. User television equipment device 801 may include set-top box 815. Set-top box 815 may be communicatively connected to microphone 816, audio output equipment (e.g., speaker or headphones 814), and display 812. In some embodiments, display 812 may be a television display or a computer display. In some embodiments, set-top box 815 may be communicatively connected to user input interface 810. In some embodiments, user input interface 810 may be a remote-control device. Set-top box 815 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 800 and user equipment device 801 may receive content and data via input/output (I/O) path (e.g., circuitry) 802. I/O path 802 may provide content (e.g., broadcast programming, on-demand programming, Internet content, content available over a local area network (LAN) or wide area network (WAN), and/or other content) and data to control circuitry 804, which may comprise processing circuitry 806 and storage 808. Control circuitry 804 may be used to send and receive commands, requests, and other suitable data using I/O path 802, which may comprise I/O circuitry. I/O path 802 may connect control circuitry 804 (and specifically processing circuitry 806) to one or more communications paths (described below). I/O functions may be provided by one or more of these communications paths, but are shown as a single path in FIG. 8 to avoid overcomplicating the drawing. While set-top box 815 is shown in FIG. 8 for illustration, any suitable computing device having processing circuitry, control circuitry, and storage may be used in accordance with the present disclosure. For example, set-top box 815 may be replaced by, or complemented by, a personal computer (e.g., a notebook, a laptop, a desktop), a smartphone (e.g., device 800), a tablet, a network-based server hosting a user-accessible client device, a non-user-owned device, any other suitable device, or any combination thereof.

Control circuitry 804 may be based on any suitable control circuitry such as processing circuitry 806. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for the codec application stored in memory (e.g., storage 808). Specifically, control circuitry 804 may be instructed by the codec application to perform the functions discussed above and below. In some implementations, processing or actions performed by control circuitry 804 may be based on instructions received from the codec application.

In client/server-based embodiments, control circuitry 804 may include communications circuitry suitable for communicating with a server or other networks or servers. The codec application may be a stand-alone application implemented on a device or a server. The codec application may be implemented as software or a set of executable instructions. The instructions for performing any of the embodiments discussed herein of the codec application may be encoded on non-transitory computer-readable media (e.g., a hard drive, random-access memory on a DRAM integrated circuit, read-only memory on a BLU-RAY disk, etc.). For example, in FIG. 8, the instructions may be stored in storage 808, and executed by control circuitry 804 of a device 800.

In some embodiments, the codec application may be a client/server application where only the client application resides on device 800, and a server application resides on an external server (e.g., server 904 and/or server 916). For example, the codec application may be implemented partially as a client application on control circuitry 804 of device 800 and partially on server 904 as a server application running on control circuitry 911. Server 904 may be a part of a local area network with one or more of devices 800 or may be part of a cloud computing environment accessed via the internet. In a cloud computing environment, various types of computing services for performing searches on the internet or informational databases, providing encoding/decoding capabilities, providing storage (e.g., for a database) or parsing data are provided by a collection of network-accessible computing and storage resources (e.g., server 904 and/or edge computing device 916), referred to as "the cloud." Device 800 may be a cloud client that relies on the cloud computing capabilities from server 904 to determine whether processing (e.g., at least a portion of virtual background processing and/or at least a portion of other processing tasks) should be offloaded from the mobile device, and facilitate such offloading. When executed by control circuitry of server 904 or 916, the codec application may instruct control circuitry 911 or 918 to perform processing tasks for the client device and facilitate the encoding/decoding.

Control circuitry 804 may include communications circuitry suitable for communicating with a server, edge computing systems and devices, a table or database server, or other networks or servers. The instructions for carrying out the above-mentioned functionality may be stored on a server (which is described in more detail in connection with FIG. 9). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 9). In addition, communications circuitry may include circuitry that enables peer-to-peer communication of user equipment devices, or communication of user equipment devices in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 808 may be used to store various types of content described herein as well as codec application data described above. Nonvolatile memory may also be used (e.g., to launch a boot-up routine and other instructions). Cloud-based storage, described in relation to FIG. 8, may be used to supplement storage 808 or instead of storage 808.

Control circuitry 804 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 804 may also include scaler circuitry for upconverting and downconverting content into the preferred output format of user equipment 800. Control circuitry 804 may also include digital-to-analog converter circuitry and analog-to-digital converter circuitry for converting between digital and analog signals. The tuning and encoding circuitry may be used by user equipment device 800, 801 to receive and to display, to play, or to record content. The tuning and encoding circuitry may also be used to receive video data for encoding/decoding data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from user equipment device 800, the tuning and encoding circuitry (including multiple tuners) may be associated with storage 808.

Control circuitry 804 may receive instruction from a user by way of user input interface 810. User input interface 810 may be any suitable user interface, such as a remote control, mouse, trackball, keypad, keyboard, touch screen, touchpad, stylus input, joystick, voice recognition interface, or other user input interfaces. Display 812 may be provided as a stand-alone device or integrated with other elements of each one of user equipment device 800 and user equipment device 801. For example, display 812 may be a touchscreen or touch-sensitive display. In such circumstances, user input interface 810 may be integrated with or combined with display 812. In some embodiments, user input interface 810 includes a remote-control device having one or more microphones, buttons, keypads, any other components configured to receive user input or combinations thereof. For example, user input interface 810 may include a handheld remote-control device having an alphanumeric keypad and option buttons. In a further example, user input interface 810 may include a handheld remote-control device having a microphone and control circuitry configured to receive and identify voice commands and transmit information to set-top box 815.

Audio output equipment 814 may be integrated with or combined with display 812. Display 812 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 812. Audio output equipment 814 may be provided as integrated with other elements of each one of device 800 and equipment 801 or may be stand-alone units. An audio component of videos and other content displayed on display 812 may be played through speakers (or headphones) of audio output equipment 814. In some embodiments, audio may be distributed to a receiver (not shown), which processes and outputs the audio via speakers of audio output equipment 814. In some embodiments, for example, control circuitry 804 is configured to provide audio cues to a user, or other audio feedback to a user, using speakers of audio output equipment 814. There may be a separate microphone 816 or audio output equipment 814 may include a microphone configured to receive audio input such as voice commands or speech. For example, a user may speak letters or words that are received by the microphone and converted to text by control circuitry 804. In a further example, a user may voice commands that are received by a microphone and recognized by control circuitry 804. Camera 818 may be any suitable video camera integrated with the equipment or externally connected. Camera 818 may be a digital camera comprising a charge-coupled device (CCD) and/or a complementary metal-oxide semiconductor (CMOS) image sensor. Camera 818 may be an analog camera that converts to digital images via a video card.

The codec application may be implemented using any suitable architecture. For example, it may be a stand-alone application wholly-implemented on each one of user equipment device 800 and user equipment device 801. In such an approach, instructions of the application may be stored locally (e.g., in storage 808), and data for use by the application is downloaded on a periodic basis (e.g., from an out-of-band feed, from an Internet resource, or using another suitable approach). Control circuitry 804 may retrieve instructions of the application from storage 808 and process the instructions to provide encoding/decoding functionality and perform any of the actions discussed herein. Based on the processed instructions, control circuitry 804 may determine what action to perform when input is received from user input interface 810. For example, movement of a cursor on a display up/down may be indicated by the processed instructions when user input interface 810 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the codec application is a client/server-based application. Data for use by a thick or thin client implemented on each one of user equipment device 800 and user equipment device 801 may be retrieved on-demand by issuing requests to a server remote to each one of user equipment device 800 and user equipment device 801. For example, the remote server may store the instructions for the application in a storage device. The remote server may process the stored instructions using circuitry (e.g., control circuitry 804) and generate the displays discussed above and below. The client device may receive the displays generated by the remote server and may display the content of the displays locally on device 800. This way, the processing of the instructions is performed remotely by the server while the resulting displays (e.g., that may include text, a keyboard, or other visuals) are provided locally on device 800. Device 800 may receive inputs from the user via input interface 810 and transmit those inputs to the remote server for processing and generating the corresponding displays. For example, device 800 may transmit a communication to the remote server indicating that an up/down button was selected via input interface 810. The remote server may process instructions in accordance with that input and generate a display of the application corresponding to the input (e.g., a display that moves a cursor up/down). The generated display is then transmitted to device 800 for presentation to the user.

In some embodiments, the codec application may be downloaded and interpreted or otherwise run by an interpreter or virtual machine (run by control circuitry 804). In some embodiments, the codec application may be encoded in the ETV Binary Interchange Format (EBIF), received by control circuitry 804 as part of a suitable feed, and interpreted by a user agent running on control circuitry 804. For example, the codec application may be an EBIF application. In some embodiments, the codec application may be defined by a series of JAVA-based files that are received and run by a local virtual machine or other suitable middleware executed by control circuitry 804. In some of such embodiments (e.g., those employing MPEG-2 or other digital media encoding schemes), codec application may be, for example, encoded and transmitted in an MPEG-2 object carousel with the MPEG audio and video packets of a program.

FIG. 9 is a diagram of an illustrative system 900 for encoding/decoding, in accordance with some embodiments of this disclosure. User equipment devices 903, 907, 908, 910 (e.g., which may correspond to one or more of computing device may be coupled to communication network 906). Communication network 906 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 906) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 9 to avoid overcomplicating the drawing.

Although communications paths are not drawn between user equipment devices, these devices may communicate directly with each other via communications paths as well as other short-range, point-to-point communications paths, such as USB cables, IEEE 994 cables, wireless paths (e.g., Bluetooth, infrared, IEEE 702-11x, etc.), or other short-range communication via wired or wireless paths. The user equipment devices may also communicate with each other directly through an indirect path via communication network 906.

System 900 may comprise media content source 902, one or more servers 904, and one or more edge computing devices 916 (e.g., included as part of an edge computing system). In some embodiments, the codec application may be executed at one or more of control circuitry 911 of server 904 (and/or control circuitry of user equipment devices 903, 907, 908, 910 and/or control circuitry 918 of edge computing device 916). In some embodiments, a data structure transmitted by transmitter 702 of FIG. 7A may be stored at database 905 maintained at or otherwise associated with server 904, and/or at storage 922 and/or at storage of one or more of user equipment devices 903, 907, 908, 910.

In some embodiments, server 904 may include control circuitry 911 and storage 914 (e.g., RAM, ROM, Hard Disk, Removable Disk, etc.). Storage 914 may store one or more databases. Server 904 may also include an input/output path 912. I/O path 912 may provide encoding/decoding data, device information, or other data, over a local area network (LAN) or wide area network (WAN), and/or other content and data to control circuitry 911, which may include processing circuitry, and storage 914. Control circuitry 911 may be used to send and receive commands, requests, and other suitable data using I/O path 912, which may comprise I/O circuitry. I/O path 912 may connect control circuitry 911 (and specifically control circuitry) to one or more communications paths.

Control circuitry 911 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 911 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 911 executes instructions for an emulation system application stored in memory (e.g., the storage 914). Memory may be an electronic storage device provided as storage 914 that is part of control circuitry 911.

Edge computing device 916 may comprise control circuitry 918, I/O path 920 and storage 922, which may be implemented in a similar manner as control circuitry 911, I/O path 912 and storage 924, respectively of server 904. Edge computing device 916 may be configured to be in communication with one or more of user equipment devices 903, 907, 908, 910 and server 904 over communication network 906, and may be configured to perform processing tasks (e.g., for encoding/decoding) in connection with ongoing processing of video data. In some embodiments, a plurality of edge computing devices 916 may be strategically located at various geographic locations, and may be mobile edge computing devices configured to provide processing support for mobile devices at various geographical regions.

Figure 10:
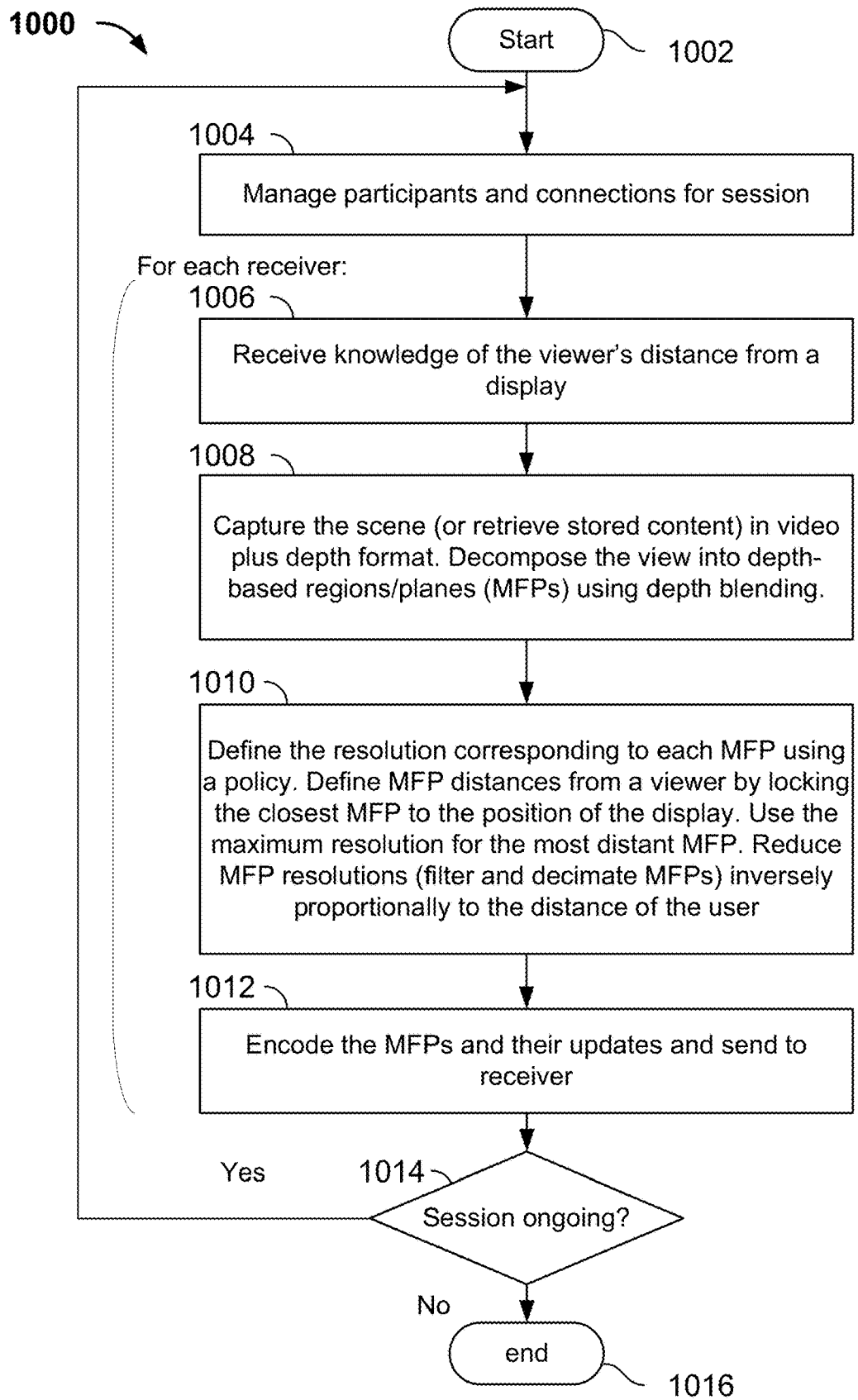
FIG. 10 is a flowchart of an illustrative process for transmitting an image, in accordance with some embodiments of this disclosure.
Figure 11:
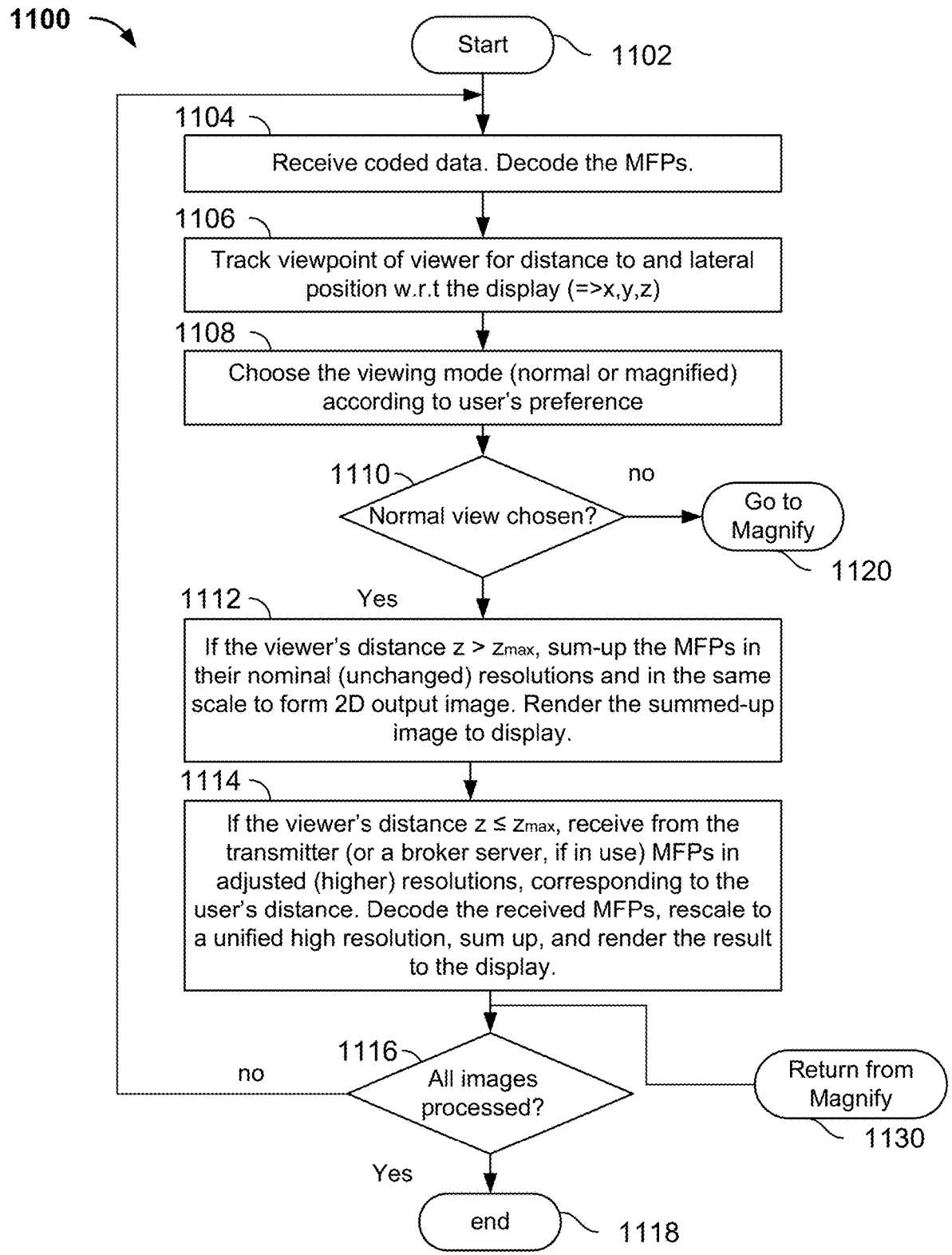
FIG. 11 is a flowchart of an illustrative process for receiving an image, in accordance with some embodiments of this disclosure.
Figure 12:
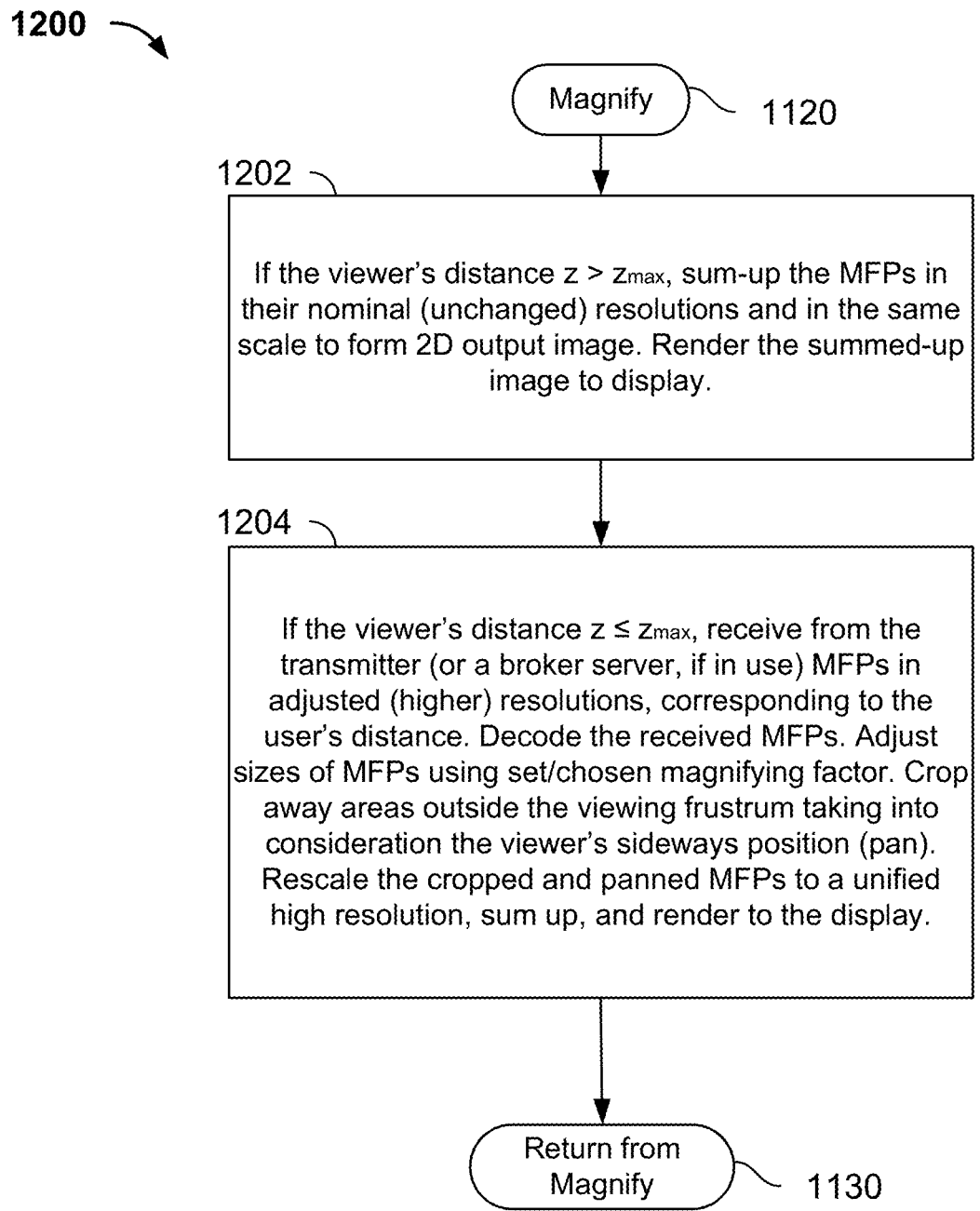
FIG. 12 is another flowchart of an illustrative process for receiving an image, in accordance with some embodiments of this disclosure.

FIGS. 10-12 are flowcharts of illustrative processes, in accordance with some embodiments of this disclosure. In various embodiments, the individual steps of process 1000, 1100, and 1200 may be implemented by one or more components of the devices and systems of FIGS. 1A-C, 2A-B, 3-4, 7A-B, 8-9. Although the present disclosure may describe certain steps of the process (and of other processes described herein) as being implemented by certain components of the devices and systems of FIGS. 1A-C, 2A-B, 3-4, 7A-B, 8-9, this is for purposes of illustration only, and it should be understood that other components of the devices and systems of FIGS. 1A-C, 2A-B, 3-4, 7A-B, 8-9 may implement those steps instead.

FIG. 10 is a flowchart of an illustrative process for transmitting an image, in accordance with some embodiments of this disclosure.

At step 1002, process 1000 begins (e.g., when a server 702 or 752 begins to encode image data for transmission for a session).

At step 1004, control circuitry (e.g., circuitry 918 of FIG. 9) of a computing device (e.g., server 702 or 752) manages participants and connections for a session.

For each receiver (e.g., each participant and connection of the session), the steps 1004-1010 may be performed.

At step 1006, input/output circuitry (e.g., circuitry 920 of FIG. 9) of the computing device receives knowledge of the viewer's distance from a display.

At step 1008, input/output circuitry captures a scene (or retrieves) stored content in video plus depth format. The control circuitry decomposes the view into depth-based regions/planes (MFPs) using depth blending. For example, decomposition may be performed as shown in element 714 in FIGS. 7A-B.

At step 1010, control circuitry defines the resolution corresponding to each MFP using a policy. The control circuitry defines MFP distances from a viewer (e.g., user) by locking the closest MFP to the position of the display. The control circuitry uses the maximum resolution for the most distant MFP. The control circuitry reduces MFP resolutions (filter and decimate MFPs) inversely proportionally to the distance of the user. For example, resolution adjustment may be performed as described in element 716 of FIG. 7A. As another example, resolution adjustment may be performed as described in element 724 of FIG. 7B.

At step 1012, control circuitry encodes the MFPs and their updates and send to receiver. For example, parallel MFP coding may be performed as described in element 718 of FIGS. 7A-B.

At step 1014, control circuitry checks if the session is ongoing. If not, the process returns to 1002. If so, the process ends at 1016.

FIGS. 11-12 shows a simplified flow chart for a receiver (decoder) in the disclosed approach (including enhanced quality and magnifying modes).

FIG. 11 is a flowchart of an illustrative process 1100 for receiving an image, in accordance with some embodiments of this disclosure.

At step 1102, process 1100 begins (e.g., when a device 704 or 754 begins to receive the coded image data).

At step 1104, input/output circuitry (e.g., circuitry 920 of FIG. 9) of a computing device (e.g., device 704 or 754) receives coded data. Control circuitry (e.g., circuitry 918 of FIG. 9) of the computing device decodes the MFPs. For example, parallel MFP decoding may be performed as described in element 722 of FIGS. 7A-B.

At step 1106, control circuitry tracks viewpoint of viewer for distance to and lateral position with respect to the display (=>x,y,z). For example, tracking the viewpoint of the user may be performed as described by element 705 in FIGS. 7A-B.

At step 1108, control circuitry chooses the viewing mode (enhanced quality or magnified) according to user's preference.

At step 1110, control circuitry checks whether an enhanced quality mode is chosen. If so, the process proceeds to 1112. If not, the process proceeds to a magnify mode process 1120. For example, the checking whether enhanced quality or magnify mode is chosen may be performed as described by element 707 in FIGS. 7A-B. Details about the magnify mode process 1120 is in the description of FIG. 12. The process may return from the magnify mode process at 1130 to proceed to 1116.

At step 1112, if the viewer's distance $z>z_{max}$, control circuitry sums-up (pixel by pixel) the MFPs in their nominal (unchanged) resolutions and in the same scale to form 2D output image. The control circuitry renders the summed-up image to a display (e.g., as described by element 726 in FIGS. 7A-B).

At step 1114, if the viewer's distance $z \leq z_{max}$, input/output circuitry receives from the transmitter (or a broker server, if in use) MFPs in adjusted (higher) resolutions, corresponding to the user's distance. The control circuitry decodes the received MFPs, rescales the MFPs to a unified high resolution, and sums up (pixel by pixel) the rescaled MFPs. For example, parallel MFP decoding may be performed as described in element 722 and resolution adjustment may be performed as described in element 724 of FIG. 7A. MFPs are summed pixel by pixel for a 2D display. The control circuitry renders the summed-up image to a display (e.g., as described by element 726 in FIG. 7A).

At step 1116, control circuitry checks if all images are processed. If not, the process returns to 1102. If so, the process ends at 1118.

FIG. 12 is another flowchart of an illustrative process 1200 for receiving an image, in accordance with some embodiments of this disclosure.

At step 1120, process 1200 begins (e.g., when a server 702 or 752 begins the magnify mode process from step 1110 after determining an enhanced quality mode was not chosen).

At step 1202, if the viewer's distance $z>z_{max}$, control circuitry sums-up (pixel by pixel) the MFPs in their nominal (unchanged) resolutions and in the same scale to form 2D output image. The control circuitry renders the summed-up image to a display (e.g., as described by element 726 in FIG. 7A).

At step 1204, if the viewer's distance $z \leq z_{max}$, input/output circuitry receives from the transmitter (or a broker server, if in use) MFPs in adjusted (higher) resolutions, corresponding to the user's distance. The control circuitry decodes the received MFPs. For example, parallel MFP decoding may be performed as described in element 722. The control circuitry adjusts sizes of MFPs using set/chosen magnifying factor, and crops away areas outside the viewing frustum taking into consideration the viewer's sideways position (pan), rescales the cropped and panned MFPs to a unified high resolution and sums up the rescaled, cropped and panned MFPs. For example, resolution and pan/crop adjustment may be performed as described in element 724 of FIG. 7A. The control circuitry renders the summed-up image to a display (e.g., as described by element 726 in FIG. 7A).

In some embodiments, instead of using MFPs, there may be a different way to modify a captured scene to create a more natural depiction. For example, a captured scene may comprise objects at different depths, and metadata may be provided for each object at each depth. Each object of the image may be stored at different resolutions, and the objects of the captured scene can be changed in resolution based on the viewing distance. For example, as a user approaches a display, and pixels of the object further in depth can be provided at a higher resolution while pixels of an object closer in depth can be provided at a lower resolution. In some embodiments, higher resolution data may be transmitted as enhancement layers.

In the described enhanced quality and magnifying modes, more details e.g., higher resolution images, are received over network if a viewer approaches the display. It means that the described approach is a 'detail-on-demand' approach where the details are sent by sequentially changing MFP resolutions based on changes in a viewer's viewing distance.

In some embodiments, detail updates may be transmitted as enhancement layers to a nominal (lower resolution) set of MFPs. Such embodiments use enhancement layers (such as layered coding). The enhancement layers may be formed using the following principles. The distance of a viewer to the display may be sent to a transmitter to decide on the required update. Enhancement layers may contain e.g., the filtered-out data, when decimating MFPs or the original texture image for supporting multiple resolutions (for example, decomposing the image by pixel distances for controlling resolution). When decimating a stack of MFPs, the update information may include differences between each original (non-filtered, non-decimated) MFP and its corresponding filtered and sub-sampled version. The above differences may form a sc. Laplace pyramid for which the compression coding may be optimized. For example, a Laplacian Pyramid for compression coding may be described in Burt, Peter J. and Edward H. Adelson. "The Laplacian Pyramid as a Compact Image Code." IEEE Trans. Commun. 31 (1983): 532-540, which is herein incorporated by reference in its entirety.

The processes discussed above are intended to be illustrative and not limiting. One skilled in the art would appreciate that the steps of the processes discussed herein may be omitted, modified, combined and/or rearranged, and any additional steps may be performed without departing from the scope of the disclosure. More generally, the above disclosure is meant to be illustrative and not limiting. Only the claims that follow are meant to set bounds as to what the present disclosure includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving, at a computing device, a distance between a user and a display device;
   selecting, based at least in part on the distance between the user and the display device, a quality level for each depth layer of a plurality of depth layers of an image;
   transmitting a version of each depth layer at the selected quality level to the display device to cause the display device to:
   reconstruct the image based on the transmitted version of each depth layer; and
   generate for display the reconstructed image; and
   causing the display device to:
   select, based at least in part on the distance between the user and the display device, a respective zoom level for each transmitted version of each depth layer of the plurality of depth layers of the image; and
   modify each respective depth layer according to the selected respective zoom level, wherein at least some of the respective zoom level are different from each other.

2. The method of claim 1, wherein the quality level is a resolution level.

3. The method of claim 1, further comprising encoding each depth layer at the selected quality level, wherein the transmitting the version of each layer comprises transmitting the encoded version of each depth layer at the selected quality level.

4. The method of claim 1, further comprising accessing a pre-encoded version of each depth layer at the selected quality level, wherein the transmitting the version of each depth layer comprises transmitting the accessed pre-encoded version of each depth layer at the selected quality level.

5. The method of claim 1, wherein the plurality of depth layers are multi focal planes (MFPs) and the reconstruction of the image comprises summing the MFPs.

6. The method of claim 1, wherein the display device is an accommodative display, and wherein the transmitting the version of each depth layer at the selected quality level to the display device causes the display device to generate for display the reconstructed image by generating for display the transmitted version of each depth layer at a different distance of the accommodative display.

7. The method of claim 1, wherein a deeper layer of the plurality of depth layers of the image is selected at a higher quality as a distance decreases between the user and the display device.

8. The method of claim 1, wherein the display device is a television or computer display, and the distance between the user and the display device is a distance between a face of the user and the television or computer display.

9. The method of claim 1, wherein the display device is a handheld device, and the distance between the user and the display device is a distance between a face of the user and the handheld device.

10. The method of claim 1, wherein the display device is an extended reality (XR) device, and the distance between the user and the display device is a distance between a hand of the user and the XR device.

11. The method of claim 1, further comprising causing the display device to:
    detect a lateral position of the user to the display device; and
    modify each respective depth layer according to the lateral position of the user to the display device.

12. The method of claim 11, wherein the display device is a mobile phone, and the lateral position is based on a position of a face of the user in a frontal camera view of the mobile phone.

13. The method of claim 11, wherein the display device is an extended reality (XR) device, and the lateral position is based on a lateral position of a hand of the user to a XR device.

14. The method of claim 1, further comprising:
    selecting a zoom level for each depth layer of the plurality of depth layers of the image based on the distance between the user and the display device; and
    wherein the transmitting the version of each depth layer comprises transmitting the version of each depth layer at the selected zoom level.

15. The method of claim 14, further comprising:
    receiving, at the computing device, a lateral position of the user with respect to the display device; and
    adjusting the version of each depth layer based on the lateral position of the user; and
    wherein the transmitting the version of each depth layer comprises transmitting the version of each depth layer adjusted based on the lateral position of the user.

16. The method of claim 1, wherein modifying each respective depth layer according to the selected zoom level further comprises:
    applying a respective magnification factor to each respective depth layer; and
    cropping each respective depth layer based at least in part on an original size of the image.

17. A system comprising:
    input/output circuitry configured to:
    receive, at a computing device, a distance between a user and a display device; and control circuitry configured to:

select, based at least in part on the distance between the user and the display device, a quality level for each depth layer of a plurality of depth layers of an image, wherein the input/output circuitry is further configured to:

transmit a version of each layer at the selected quality level to the display device to cause the display device to:

reconstruct the image based on the transmitted version of each layer; and generate for display the reconstructed image; and cause the display device to:

select, based at least in part on the distance between the user and the display device, a respective zoom level for each transmitted version of each depth layer of the plurality of depth layers of the image; and modify each respective depth layer according to the selected respective zoom level, wherein at least some of the respective zoom level are different from each other.

18. The system of claim 17, wherein the quality level is a resolution level.

19. The system of claim 17, wherein the control circuitry is further configured to encode each depth layer at the selected quality level, wherein the input/output circuitry is configured to transmit the version of each depth layer by transmitting the encoded version of each depth layer at the selected quality level.

20. The system of claim 17, wherein the control circuitry is further configured to: access a pre-encoded version of each depth layer at the selected quality level, wherein the input/output circuitry is configured to transmit the version of each layer by transmitting the accessed pre-encoded version of each depth layer at the selected quality level.

* * * * *